United States Patent
Noel et al.

(10) Patent No.: US 12,328,234 B2
(45) Date of Patent: Jun. 10, 2025

(54) SYSTEMS AND METHODS FOR BEHAVIORAL LINK PREDICTION FOR NETWORK ACCESS MICROSEGMENTATION POLICY

(71) Applicant: The MITRE Corporation, McLean, VA (US)

(72) Inventors: Steven E. Noel, Woodbridge, VA (US); Vipin Swarup, McLean, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 18/122,442

(22) Filed: Mar. 16, 2023

(65) Prior Publication Data

US 2023/0300032 A1    Sep. 21, 2023

Related U.S. Application Data

(60) Provisional application No. 63/321,476, filed on Mar. 18, 2022.

(51) Int. Cl.
*H04L 41/14* (2022.01)
*H04L 41/12* (2022.01)
(Continued)

(52) U.S. Cl.
CPC .......... *H04L 41/145* (2013.01); *H04L 41/12* (2013.01); *H04L 41/142* (2013.01); *H04L 41/147* (2013.01)

(58) Field of Classification Search
CPC ..... H04L 41/145; H04L 41/12; H04L 41/142; H04L 41/147; H04L 41/0893
See application file for complete search history.

(56) References Cited

U.S. PATENT DOCUMENTS

| | | |
|---|---|---|
| 5,802,292 A | 9/1998 | Mogul |
| 8,954,524 B1 | 2/2015 | Hamon |
| | (Continued) | |

FOREIGN PATENT DOCUMENTS

| | | | | |
|---|---|---|---|---|
| CN | 112039700 B | * | 11/2021 | .......... H04L 41/142 |
| EP | 1550074 A1 | | 7/2005 | |
| | (Continued) | | | |

OTHER PUBLICATIONS

Wang et al. Link Prediction in Social Networks: the State-of-the-Art, Jan. 2015, Science China-Information Sciences, vol. 58, p. 1-38 (Year: 2015).*

(Continued)

*Primary Examiner* — Schquita D Goodwin
*Assistant Examiner* — Joseph M Cousins
(74) *Attorney, Agent, or Firm* — Morrison & Foerster LLP

(57) ABSTRACT

Described herein are systems and methods for grouping computing devices in a computing network and predicting future communications links between computing devices for the purpose of developing a computing network microsegmentation policy. In one or more examples, the systems and methods described herein can predict future links in a computing network using a plurality of combinations of node similarity, node grouping, and link prediction methods. Each unique combination of methods can be assessed by comparing the predicted links to observed network traffic to determine the quality of the prediction. The quality of prediction can be assessed by generate F1 curves for each combination of methods. The combination with the highest quality prediction can then be selected and tuned (by adjusting a threshold associated with the combination). Once tuned, the selected combination (i.e., model) can then be (Continued)

used generate and/or modify a microsegmentation policy associated with the computing network.

48 Claims, 11 Drawing Sheets

(51) Int. Cl.
*H04L 41/142* (2022.01)
*H04L 41/147* (2022.01)

(56) References Cited

U.S. PATENT DOCUMENTS

| | | | |
|---|---|---|---|
| 9,552,550 | B2 | 1/2017 | Vasseur |
| 9,628,553 | B2 | 4/2017 | El |
| 10,212,191 | B2 | 2/2019 | Kirner |
| 11,095,611 | B2 | 8/2021 | Fandli |
| 11,121,875 | B2 | 9/2021 | Kimer |
| 11,171,991 | B2 | 11/2021 | Gupta |
| 11,223,643 | B2 | 1/2022 | Sanghvi |
| 2004/0243548 | A1 | 12/2004 | Hulten |
| 2005/0047412 | A1 | 3/2005 | Hares |
| 2013/0144818 | A1 | 6/2013 | Jebara |
| 2015/0195136 | A1 | 7/2015 | Mermoud |
| 2017/0185910 | A1 | 6/2017 | Appel |
| 2017/0244778 | A1 | 8/2017 | Zhu |
| 2017/0339188 | A1* | 11/2017 | Jain ................ G06F 9/455 |
| 2019/0327271 | A1* | 10/2019 | Saxena ................ G06F 8/38 |
| 2020/0137123 | A1* | 4/2020 | Nimmagadda ..... H04L 63/0263 |
| 2021/0194907 | A1* | 6/2021 | Bertiger ............ H04L 43/0811 |
| 2021/0314345 | A1 | 10/2021 | Glenn |
| 2021/0314346 | A1 | 10/2021 | Glenn |

FOREIGN PATENT DOCUMENTS

| | | | |
|---|---|---|---|
| EP | 2911349 | A1 | 8/2015 |
| EP | 2911349 | B1 | 2/2016 |

OTHER PUBLICATIONS

Yu et al. Link Prediction with Spatial and Temporal Consistency in Dynamic Networks, Aug. 2017, Twenty-Sixth International Joint Conference on Artificial Intelligence (IJCAI-17), p. 1-7 (Year: 2017).*

Friedman (2017). "The Definitive Guide to Micro-Segmentation" Illumio; 80 pages.

* cited by examiner

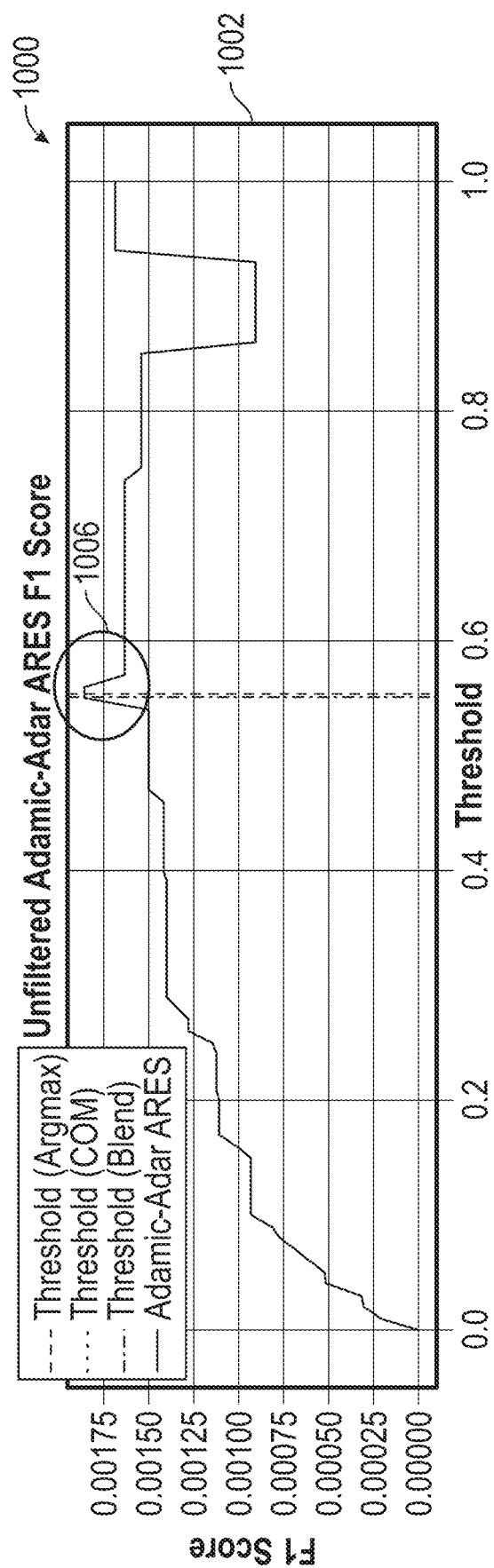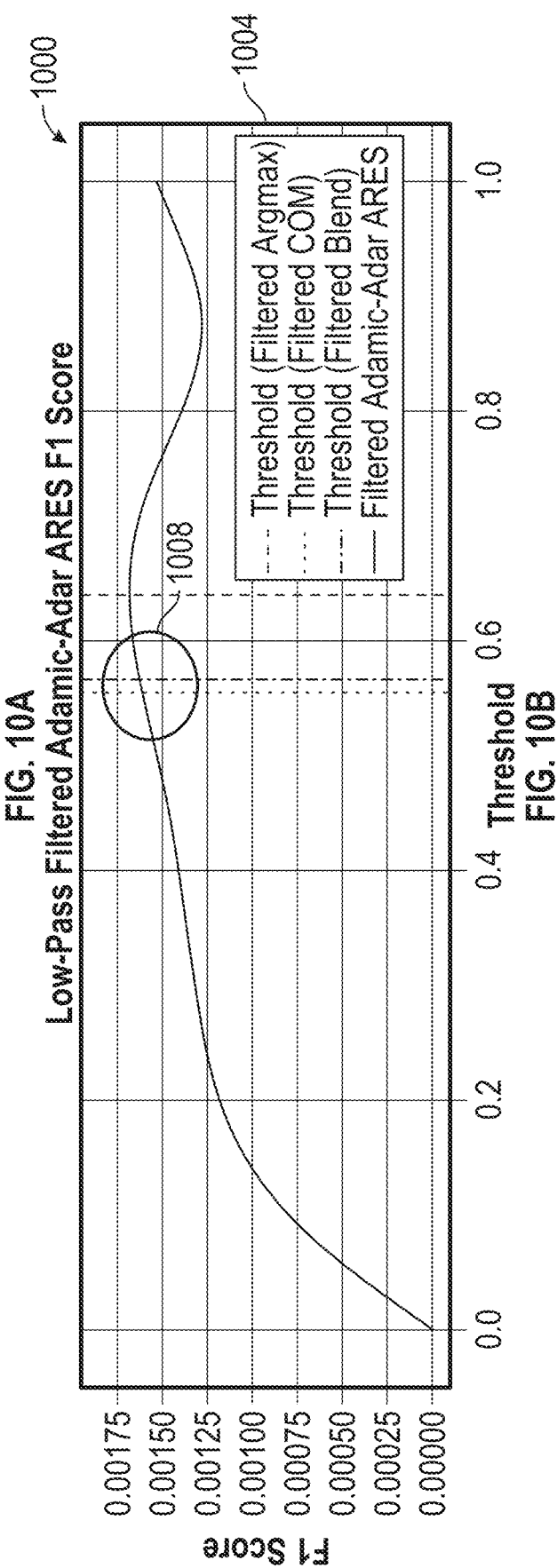
FIG. 10A
FIG. 10B

SYSTEMS AND METHODS FOR BEHAVIORAL LINK PREDICTION FOR NETWORK ACCESS MICROSEGMENTATION POLICY

CROSS-REFERENCE TO RELATED APPLICATIONS

This application claims the benefit of U.S. Provisional Application No. 63/321,476, filed Mar. 18, 2022, the entire contents of which is incorporated herein by reference.

FIELD OF THE DISCLOSURE

This disclosure relates predicting future communications links in a computing network and using those predictions to generate a microsegmentation policy for the computer network.

BACKGROUND OF THE DISCLOSURE

Enterprise network architectures have grown increasingly complex, especially given trends such as increased platform mobility and cloud computing. Enterprises no longer have single, easily identifiable perimeters. With perimeter-based security, once an attacker has breached a perimeter, there is full freedom of movement inside the network. An enterprise must therefore continually assess risks to its network assets and deploy protections to mitigate those risks, including requiring authorization for each request for access to network resources. Thus, even if an individual is working inside of a trusted computer network, they may still need to seek authorization for each network request. In this way, if a malicious user or entity has breached the network, by having to seek authorization each time they use network resources, their freedom of movement may be restricted within the network.

A key technology for implementing impeding the movement of malicious actors within a network is network microsegmentation. Traditionally, network segmentation has been oriented on "north-south" traffic, i.e., client-server interactions across a security perimeter. But in today's complex enterprise networks, security perimeters are ineffective since most traffic flows "east-west" (server to server). In such environments, effective security requires network access controls at a much more granular level. Microsegmentation can refer to a set of policy and/or rules in computing networks wherein network traffic and interactions can be restricted in an attempt to limit the ability of a malicious user from having total access to the network even if they gain access to a part of the network. Effective microsegmentation policies must balance network resource availability to legitimate users vs. limiting or eliminating malicious user activity in the network. In other words, a very heavy-handed policy may be effective at limiting the activities of a malicious user but can cause unacceptable frustration to authorized users when accessing network resources. A relaxed microsegmentation policy may allow authorized users to efficiently access network resources but may not effectively restrict malicious user access. Thus, a balanced microsegmentation policy can employ one or more processes for assessing risks and balancing those risks against ease of access One data-driven approach to the formulation of microsegmentation policy is to cluster nodes of the computing network based on similarities in their observed traffic links, and to define access rules at the cluster level. By clustering components in a computing network, a microsegmentation policy can allow access between network resources, and restrict access to all other network resources by default. By observing traffic links, a policy can be created such that previously observed trafficked communications links and computing resources are allowed thus ensuring that microsegmentation doesn't frustrate access between resources. However, using observed traffic to define policy rules can lead to a "reactive" microsegmentation policy that is tailored to past activity of a network but may not be adequate for future network activity. Thus, what is needed is a method of predicting future link activity that can be used to generate microsegmentation policies for a network that not only is reactive to past network traffic, but also proactively implements policies that can be relevant for future network traffic.

SUMMARY OF THE DISCLOSURE

Described herein are systems and methods for grouping computing devices in a computing network and predicting future communications links between computing devices for the purpose of developing a computing network microsegmentation policy. In one or more examples, the systems and methods can include collecting traffic information regarding communications between computing devices in a computing network. In one or more examples, a graph model of the communications between devices can be generated based on the collected information. In one or more examples, each computing device (i.e., node) of the computing network can be assessed for similarity to one another. In one or more examples, determining node similarity can be assessed using a plurality of techniques including: Jaccard, Adamic-Adar, Resource Allocation, Common Neighbor, and Preferential Attachment. In one or more examples, node similarity can be assessed using a plurality of the methods described above such that a plurality of node similarity results can be generate, each result pertaining to a method of the plurality of node similarity methods used.

In one or more examples, each node similarity result of the plurality of results can be used to determine one or more node groupings. In one or more examples, node groupings can be determined using a plurality of methods including: Pairwise, HDBSCAN, and Hierarchical. In one or more examples, every permutation of node similarity result and node grouping technique can be explored. Thus, in one or more examples, each node similarity method can be used with each node group technique such that a plurality of node grouping results are generated, each node grouping result pertaining to a specific combination of node similarity method and node grouping method.

In one or more examples, for each node grouping results of the plurality of node grouping results (i.e., every combination of node similarity and node grouping techniques) one or more predicted links in the computing network can be identified. In one or more examples, the one or more links can be predicted based on affinity between nodes and/or dependency between nodes. In one or more examples, once a link has been predicted, the computing network can be monitored for a pre-determined time period to determine the quality of the prediction. In one or more examples, the observed traffic can be assessed and a combination of node similarity and node grouping techniques can be selected based on the determined quality of prediction. In one or more examples, the quality of prediction can be assessed using techniques such as: Precision, Recall, and F1 score. In one or more examples, once the combination of node similarity and node grouping techniques has been selected, the process can then move to model tuning, wherein certain parameters of the selected node similarity and node grouping techniques can be tuned to determine the optimal combination of parameters. In one or more examples, the tuning can include using such techniques as: low-pass filtering; center of mass, and/or arg max.

In one or more examples, once the model (i.e., the combination of node similarity and node grouping techniques) has been tuned, the model can be used to generate a microsegmentation policy for the computing network, that can be ultimately deployed onto the computing network during its operation.

In one or more examples, a method for predicting future links between one or more computing devices in a computing network comprises: receiving first traffic information, wherein the first traffic information comprises information about one or more data transmissions between the one or more computing devices in the computing network, and wherein the first traffic information is collected over a pre-determined time period, generating a graph model of the computing network based on the received first traffic information, wherein the graph model comprises a plurality of nodes representing one or more computing devices in the computing network, and wherein the graph model comprises one or more edges representing data transmissions between the plurality of nodes, applying a plurality of node similarity calculation methods to the generated graph, and wherein the plurality of node similarity calculation methods generate a plurality of node similarity calculation results, for each node similarity calculation result of the plurality of node calculation results, applying a plurality of node grouping methods to the generated graph to generate a plurality of node grouping results, wherein each node grouping result corresponds to a combination of a node similarity calculation method of the plurality of node similarity calculation methods and a node grouping method of the method of the plurality of node grouping methods, and for each combination of a node similarity calculation method of the plurality of node similarity calculation methods and a node grouping method of the method of the plurality of node grouping methods, applying one or more link prediction methods to predict a future data transmission between one or more computing devices of the computing network to generate a plurality of link prediction results, wherein each link prediction result corresponds to a combination of a node similarity calculation method of the plurality of node similarity calculation methods, a node grouping method of the method of the plurality of node grouping methods, and a node link prediction method of the one or more link prediction methods.

Optionally, each node similarity calculation method of the plurality of node similarity calculation methods is configured to determine the similarity between the plurality of nodes in the generated graph.

Optionally, the plurality of node similarity methods are selected from the group consisting of: Jaccard coefficient method, Adamic-Adar method, Resource Allocation method, Common Neighbor method, and Preferential Attachment method.

Optionally, each node grouping method of the plurality of node grouping methods is configured to group one or more nodes of the generated graph based on the generated plurality of node similarity calculation results.

Optionally, the plurality of node grouping methods are selected from the group consisting of: a Pairwise grouping method, a Hierarchical Density Based Spatial Clustering of Applications with Noise (HDBSCAN) method, and a Hierarchical grouping method.

Optionally, the one or more link prediction methods are selected from the group consisting of: an affinity-based link prediction method, and a dependency-based link prediction method.

Optionally, the method comprises selecting a combination of a node similarity calculation method of the plurality of node similarity calculation methods, a node grouping method of the method of the plurality of node grouping methods, and a node link prediction method of the one or more link prediction methods.

Optionally, selecting the combination comprises: generating a performance curve for each combination of a node similarity calculation method of the plurality of node similarity calculation methods, a node grouping method of the method of the plurality of node grouping methods, and a node link prediction method of the one or more link prediction methods.

Optionally, generating a performance curve comprises: receiving second traffic information, wherein the additional traffic information comprises information about one or more data transmissions between the one or more computing devices in the computing network occurring after the first traffic information, and wherein the second traffic information is collected over a pre-determined time period, for each combination of a node similarity calculation method of the plurality of node similarity calculation methods, a node grouping method of the method of the plurality of node grouping methods, and a node link prediction method of the one or more link prediction methods, adjusting a threshold associated with the combination, and comparing the second traffic information with the link prediction results associated with the combination.

Optionally, the method comprises: selecting a combination of a node similarity calculation method of the plurality of node similarity calculation methods, a node grouping method of the method of the plurality of node grouping methods, and a node link prediction method of the one or more link prediction methods based on the generated performance curve for each combination.

Optionally, the method comprises: selecting a threshold value associated with the combination of a node similarity calculation method of the plurality of node similarity calculation methods, a node grouping method of the method of the plurality of node grouping methods, and a node link prediction method of the one or more link prediction methods.

Optionally, selecting a threshold value comprises: applying a filter function to the performance curve associated with the combination to generate a filtered performance curve, and selecting a point on the filtered performance curve.

Optionally, selecting a point on the filtered curve comprises applying an arg max function to the filtered performance curve.

Optionally, selecting a point on the filtered curve comprises applying a center of mass function to the filtered performance curve.

Optionally, the filter function is a low-pass filter.

Optionally, the filter function is a Butterworth filter function.

Optionally, the method comprises modifying one or more microsegmentation policies of the computing network based on one or more generated link prediction results.

In one or more examples, a system for predicting future links between one or more computing devices in a computing network comprises: a memory, one or more processors, wherein the memory stores one or more programs that when executed by the one or more processors, cause the one or more processors to: receive first traffic information, wherein the first traffic information comprises information about one or more data transmissions between the one or more computing devices in the computing network, and wherein the first traffic information is collected over a pre-determined time period, generate a graph model of the computing network based on the received first traffic information, wherein the graph model comprises a plurality of nodes representing one or more computing devices in the computing network, and wherein the graph model comprises one or more edges representing data transmissions between the plurality of nodes, apply a plurality of node similarity calculation methods to the generated graph, and wherein the plurality of node similarity calculation methods generate a plurality of node similarity calculation results, for each node similarity calculation result of the plurality of node calculation results, apply a plurality of node grouping methods to the generated graph to generate a plurality of node grouping results, wherein each node grouping result corresponds to a combination of a node similarity calculation method of the plurality of node similarity calculation methods and a node grouping method of the method of the plurality of node grouping methods, and for each combination of a node similarity calculation method of the plurality of node similarity calculation methods and a node grouping method of the method of the plurality of node grouping methods, apply one or more link prediction methods to predict a future data transmission between one or more computing devices of the computing network to generate a plurality of link prediction results, wherein each link prediction result corresponds to a combination of a node similarity calculation method of the plurality of node similarity calculation methods, a node grouping method of the method of the plurality of node grouping methods, and a node link prediction method of the one or more link prediction methods.

Optionally, each node similarity calculation method of the plurality of node similarity calculation methods is configured to determine the similarity between the plurality of nodes in the generated graph.

Optionally, the plurality of node similarity methods are selected from the group consisting of: Jaccard coefficient method, Adamic-Adar method, Resource Allocation method, Common Neighbor method, and Preferential Attachment method.

Optionally, each node grouping method of the plurality of node grouping methods is configured to group one or more nodes of the generated graph based on the generated plurality of node similarity calculation results.

Optionally, the plurality of node grouping methods are selected from the group consisting of: a Pairwise grouping method, a Hierarchical Density Based Spatial Clustering of Applications with Noise (HDBSCAN) method, and a Hierarchical grouping method.

Optionally, the one or more link prediction methods are selected from the group consisting of: an affinity-based link prediction method, and a dependency-based link prediction method.

Optionally, the one or more processors are caused to select a combination of a node similarity calculation method of the plurality of node similarity calculation methods, a node grouping method of the method of the plurality of node grouping methods, and a node link prediction method of the one or more link prediction methods.

Optionally, selecting the combination comprises: generating a performance curve for each combination of a node similarity calculation method of the plurality of node similarity calculation methods, a node grouping method of the method of the plurality of node grouping methods, and a node link prediction method of the one or more link prediction methods.

Optionally, generating a performance curve comprises: receiving second traffic information, wherein the additional traffic information comprises information about one or more data transmissions between the one or more computing devices in the computing network occurring after the first traffic information, and wherein the second traffic information is collected over a pre-determined time period, for each combination of a node similarity calculation method of the plurality of node similarity calculation methods, a node grouping method of the method of the plurality of node grouping methods, and a node link prediction method of the one or more link prediction methods, adjusting a threshold associated with the combination, and comparing the second traffic information with the link prediction results associated with the combination.

Optionally, the one or more processors are caused to: select a combination of a node similarity calculation method of the plurality of node similarity calculation methods, a node grouping method of the method of the plurality of node grouping methods, and a node link prediction method of the one or more link prediction methods based on the generated performance curve for each combination.

Optionally, the one or more processors are caused to: select a threshold value associated with the combination of a node similarity calculation method of the plurality of node similarity calculation methods, a node grouping method of the method of the plurality of node grouping methods, and a node link prediction method of the one or more link prediction methods.

Optionally, selecting a threshold value comprises: applying a filter function to the performance curve associated with the combination to generate a filtered performance curve, and selecting a point on the filtered performance curve.

Optionally, selecting a point on the filtered curve comprises applying an arg max function to the filtered performance curve.

Optionally, selecting a point on the filtered curve comprises applying a center of mass function to the filtered performance curve.

Optionally, the filter function is a low-pass filter.

Optionally, the filter function is a Butterworth filter function.

Optionally, the one or more processors are caused to modify one or more microsegmentation policies of the computing network based on one or more generated link prediction results.

In one or more examples, a non-transitory computer readable storage medium storing one or more programs is provided for predicting future links between one or more computing devices in a computing network, the programs for execution by one or more processors of an electronic device that when executed by the device, cause the device to: receive first traffic information, wherein the first traffic information comprises information about one or more data transmissions between the one or more computing devices in the computing network, and wherein the first traffic information is collected over a pre-determined time period, generate a graph model of the computing network based on the received first traffic information, wherein the graph model comprises a plurality of nodes representing one or more computing devices in the computing network, and wherein the graph model comprises one or more edges representing data transmissions between the plurality of nodes; apply a plurality of node similarity calculation methods to the generated graph, and wherein the plurality of node similarity calculation methods generate a plurality of node similarity calculation results, for each node similarity calculation result of the plurality of node calculation results, apply a plurality of node grouping methods to the generated graph to generate a plurality of node grouping results, wherein each node grouping result corresponds to a combination of a node similarity calculation method of the plurality of node similarity calculation methods and a node grouping method of the method of the plurality of node grouping methods, and for each combination of a node similarity calculation method of the plurality of node similarity calculation methods and a node grouping method of the method of the plurality of node grouping methods, apply one or more link prediction methods to predict a future data transmission between one or more computing devices of the computing network to generate a plurality of link prediction results, wherein each link prediction result corresponds to a combination of a node similarity calculation method of the plurality of node similarity calculation methods, a node grouping method of the method of the plurality of node grouping methods, and a node link prediction method of the one or more link prediction methods.

Optionally, each node similarity calculation method of the plurality of node similarity calculation methods is configured to determine the similarity between the plurality of nodes in the generated graph.

Optionally, the plurality of node similarity methods are selected from the group consisting of: Jaccard coefficient method, Adamic-Adar method, Resource Allocation method, Common Neighbor method, and Preferential Attachment method.

Optionally, each node grouping method of the plurality of node grouping methods is configured to group one or more nodes of the generated graph based on the generated plurality of node similarity calculation results.

Optionally, the plurality of node grouping methods are selected from the group consisting of: a Pairwise grouping method, a Hierarchical Density Based Spatial Clustering of Applications with Noise (HDBSCAN) method, and a Hierarchical grouping method.

Optionally, the one or more link prediction methods are selected from the group consisting of: an affinity-based link prediction method, and a dependency-based link prediction method.

Optionally, the device is caused to select a combination of a node similarity calculation method of the plurality of node similarity calculation methods, a node grouping method of the method of the plurality of node grouping methods, and a node link prediction method of the one or more link prediction methods.

Optionally, selecting the combination comprises: generating a performance curve for each combination of a node similarity calculation method of the plurality of node similarity calculation methods, a node grouping method of the method of the plurality of node grouping methods, and a node link prediction method of the one or more link prediction methods.

Optionally, generating a performance curve comprises: receiving second traffic information, wherein the additional traffic information comprises information about one or more data transmissions between the one or more computing devices in the computing network occurring after the first traffic information, and wherein the second traffic information is collected over a pre-determined time period, for each combination of a node similarity calculation method of the plurality of node similarity calculation methods, a node grouping method of the method of the plurality of node grouping methods, and a node link prediction method of the one or more link prediction methods, adjusting a threshold associated with the combination, and comparing the second traffic information with the link prediction results associated with the combination.

Optionally, the device is caused to: select a combination of a node similarity calculation method of the plurality of node similarity calculation methods, a node grouping method of the method of the plurality of node grouping methods, and a node link prediction method of the one or more link prediction methods based on the generated performance curve for each combination.

Optionally, the device is caused to: select a threshold value associated with the combination of a node similarity calculation method of the plurality of node similarity calculation methods, a node grouping method of the method of the plurality of node grouping methods, and a node link prediction method of the one or more link prediction methods.

Optionally, selecting a threshold value comprises: applying a filter function to the performance curve associated with the combination to generate a filtered performance curve, and selecting a point on the filtered performance curve.

Optionally, selecting a point on the filtered curve comprises applying an arg max function to the filtered performance curve.

Optionally, selecting a point on the filtered curve comprises applying a center of mass function to the filtered performance curve.

Optionally, the filter function is a low-pass filter.

Optionally, the filter function is a Butterworth filter function.

Optionally, the device is caused to modify one or more microsegmentation policies of the computing network based on one or more generated link prediction results.

BRIEF DESCRIPTION OF THE FIGURES

FIG. 10 illustrates an exemplary filtered F1 performance curve according to examples of the disclosure.

DETAILED DESCRIPTION

Figure 1:
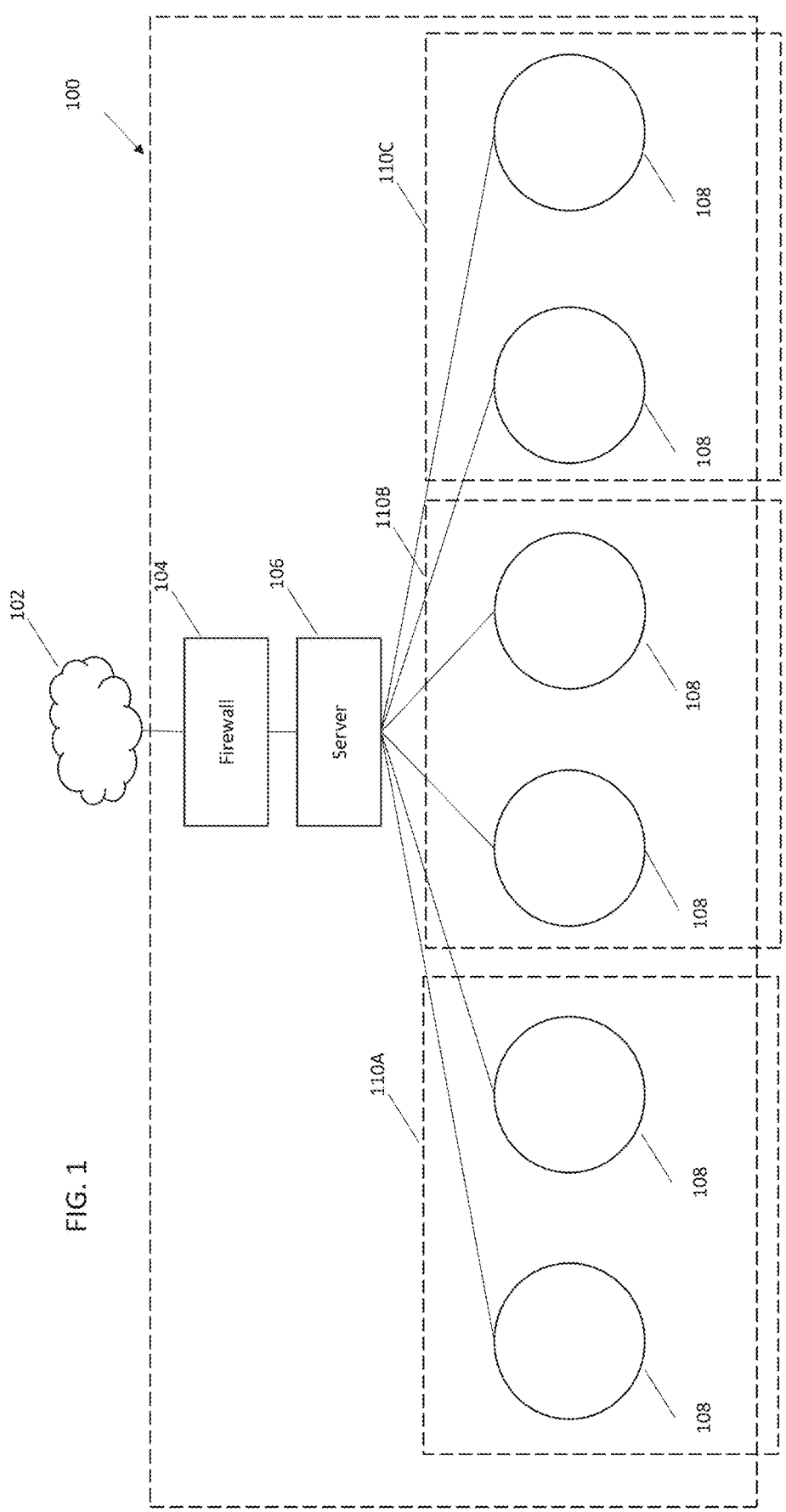
FIG. 1 illustrates an exemplary computing network according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

Enterprise computing networks, which often have connectivity to the global internet, are vulnerable to infiltration by malicious actors seeking to access the data stored in the computing network and/or causing damage to the computing network or its users. Often times the focus of network security is on preventing infiltration by the user to the network as a whole (i.e., a "north-south") attack. However, once a malicious user gains access to a single portion of the network, security protocols and techniques meant to prevent infiltration of the network do little to prevent a malicious user from gaining access to computing devices within a network once the malicious user has gained access to a single computing device.

FIG. 1 illustrates an exemplary computing network according to examples of the disclosure. In one or more examples, the network 100 can include a firewall 104 that is configured to monitor traffic received from an external network 102 such as the internet. In one or more examples, the firewall 104 can be configured to monitor traffic received from network 102 for the purpose of mitigating any traffic that appears to come from a malicious user or presents a security threat to the network. In one or more examples, the firewall 104 of network 100 can be configured to prevent "north-south" attacks in which an external entity is seek access to the network from the outside. However, in one or more examples, and as discussed in detail below, the firewall may do little to nothing to prevent or mitigate "east-west" attacks, in which a malicious user is able to gain access to a computing device 108 of the network 100 and then spread their infiltration of the network by accessing other computing devices 108 of the network 100.

In one or more examples, the network 100 can include a server/router 106 that can be configured to coordinate network traffic that comes to the network 100 from an external network 102 and intra-network traffic between the computing devices 108 of the network 100. In one or more examples, the server/router 106 can be integrated into the same device as firewall 104 or alternatively can be implemented as a stand-alone device. In one or more examples, each computing node 108 can communicate with one another independently of server 106 or all communications between computing nodes 108 can be routed through the server 106. In one or more examples, and in the case that computing nodes 108 are implemented as virtual machines, server 106 can be a hypervisor that performs the functions described above. In one or more examples, server 106, and each computing node 108 can implement one or more microsegmentation policies. As discussed above, a microsegmentation policy can refer to a set of policies for how computing devices 108 transmit data to one another and what security policy will govern the communications.

In order to prevent "east-west" attacks, in one or more examples, the server 106 and/or computing devices 108 can implement a microsegmentation policy in which computing devices 108 may require authentication or other security procedures when communicating with other computing devices. In one or more examples, microsegmentation can include grouping computing devices into one or more policy groups 110A-C. Each policy group can include one or more computing devices 108 that perform related tasks or interact with one another frequently. In one or more examples, computing devices 108 within a particular policy group may communicate with other computing devices using a similar set of rules and protocols. In one or more examples, policy groups 110A-C can overlap with one another such that one or more computing devices in the computing network can be subject to the policies associated with multiple policy groups.

In one or more examples, a successful microsegmentation policy relies on properly identifying the grouping of computing devices and communication links between computing devices that can form the basis of the microsegmentation policy. One data-driven approach to the formulation of microsegmentation policy is to cluster nodes based on similarities in their observed traffic links, and to define access rules at the cluster level. Such aggregation can induce new (previously unobserved) allowed links in the policy rules, which could be construed as a prediction of links that might be needed in the future. However, clustering (especially with overly lax cluster merging criteria) has the potential to induce links that do not actually occur in subsequent traffic (false positives), increasing the potential for adversarial lateral movement while providing no benefit in terms of network resource availability. If clusters are not properly identified (i.e., similar computing devices performing common tasks) or communication links between components in the grouping are not identified properly then a microsegmentation policy may be rooted in faulty assumptions and thus may not effectively or efficiently prevent east-west attacks. Thus, key to generating appropriate and effective microsegmentation policies is the ability to accurate identify groups of similar computing devices in the computing network and identifying traffic patterns in the computing network.

Using prior traffic data or only using data collected over a specified time period to inform microsegmentation policies can have its limitations. For instance, looking at network traffic that occurs over a small sample time may only present a snapshot and time and thus require that any microsegmentation policy implemented based on the sample of network traffic be revisited constantly to ensure that the policy is up to date. Thus, in one or more examples, the ability to not only account for prior network traffic (i.e., links between computing devices) but to also predict future links can lead to a more robust microsegmentation policy that will address observed traffic patterns, but also future traffic patterns. However, identifying clusters of computing devices to form a group and also predicting future links to make the analysis more robust can be challenging. Presented below is a process for identifying clusters and predicting links in a computing network that can be used to develop a robust microsegmentation policy for the computing network.

Figure 2:
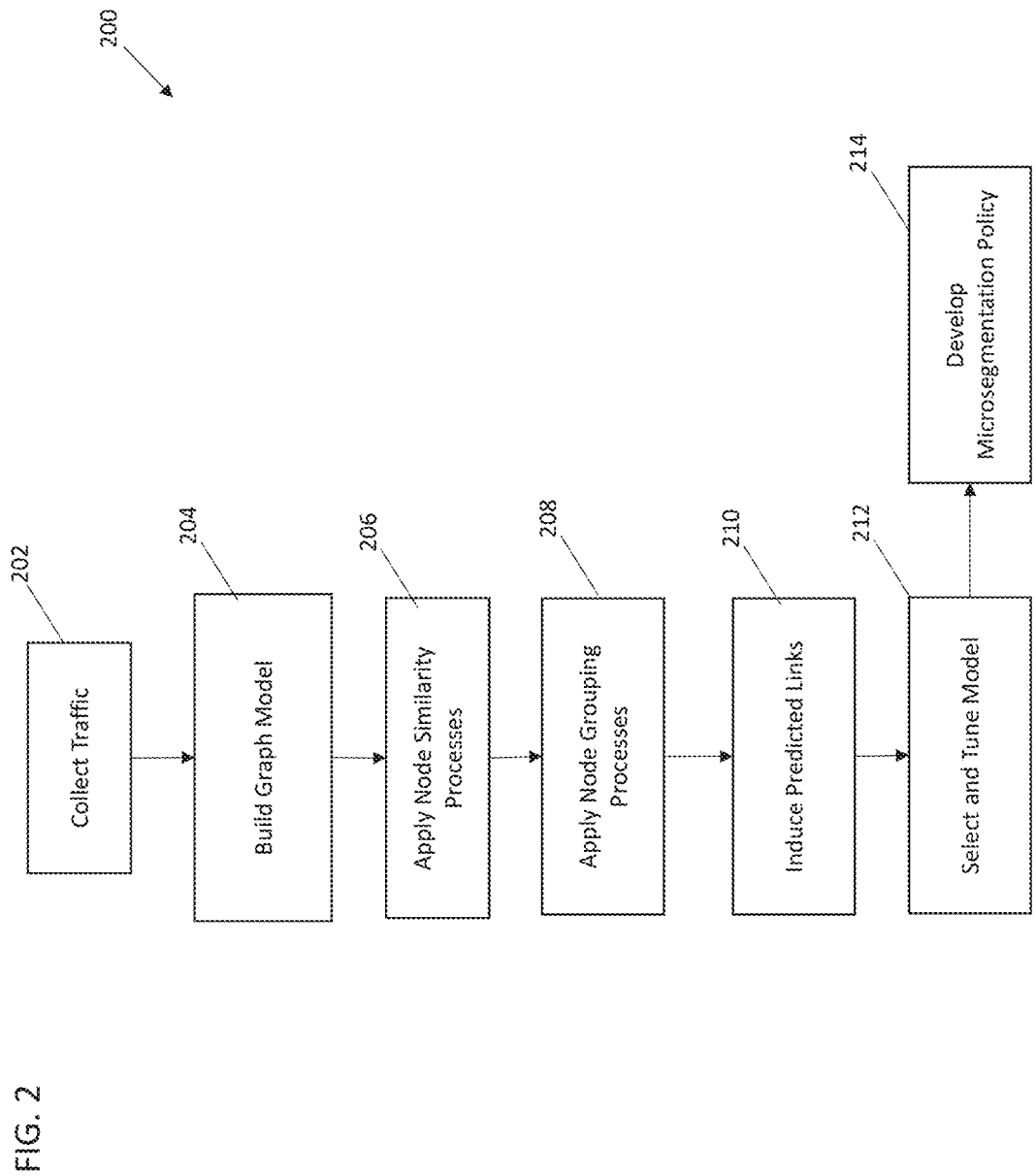
FIG. 2 illustrates an exemplary process for predicting links between computing devices in a computing network according to examples of the disclosure.

FIG. 2 illustrates an exemplary process for predicting links between computing devices in a computing network according to examples of the disclosure. In one or more examples, the process 200 of FIG. 2 can begin at step 202 wherein communications traffic information regarding a computing network being analyzed is collected. In one or more examples, flow log data can be collected from sensors that span the network and then curated, i.e., analyzed, merged, and persisted as a coherent and searchable whole. In one or more examples, flow log data can refer to data that documents the sender and the receiver of communications between computing devices of the computing network. In one or more examples, the flow log data can also be collected by a hypervisor or server/router, such as the server 106 described above with respect to FIG. 1. In one or more examples, the flow data collected can be collected for a predetermined amount of time. Thus, in one or more examples, at step 202, once flow log collection has been initiated, it can collect data until a pre-determined time has elapsed. In one or more examples, the predetermined time can be configured to balance collecting a substantial amount of data (in order to make accurate link predictions) and running a pragmatic and time efficient analysis. In other words, if the predetermined time period is too short, the analysis may be faster but may be less accurate in forming clusters and predicting links.

In one or more examples, once the traffic data has been collected at step 202, the process 200 can move to step 204 wherein the traffic data collected at step 202 can be converted into a graph format (that as discussed below can be used to perform the analysis). In one or more examples, the traffic data collected at step 202 (as discussed above) includes information about the sender and receiver of every transmission communicated through the computing network. Thus, in one or more examples, that information can be converted into a graph format by representing the sender and receiver as nodes in a graph, and the communication between them can be represented as a directional edge, indicating not only that a data transmission occurred between the computing devices, but which way the communication flowed between the nodes (i.e., who is the receiver and who is the sender of a particular transmission.)

Figure 3:
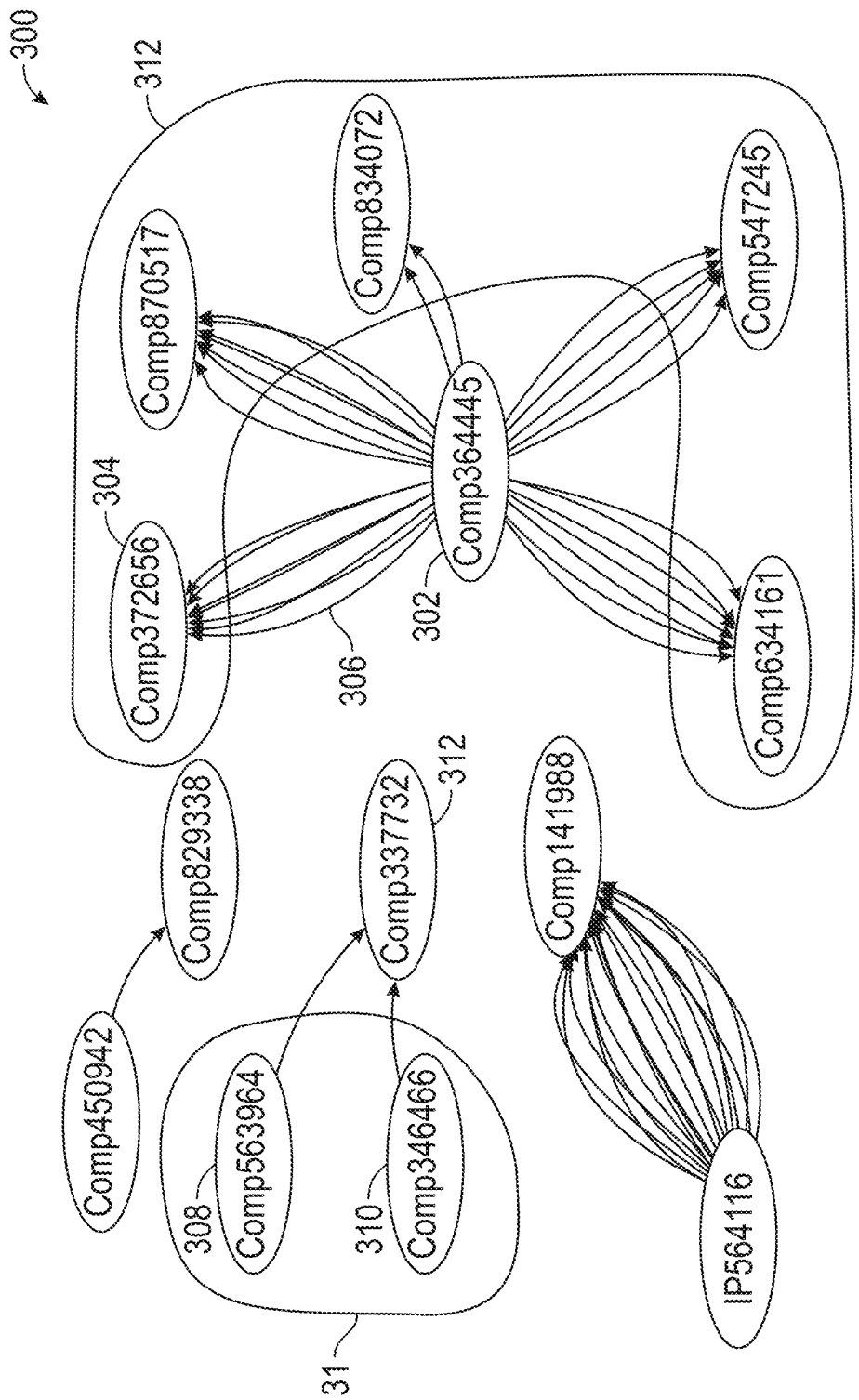
FIG. 3 illustrates an exemplary graph model of network communications according to examples of the disclosure.

FIG. 3 illustrates an exemplary graph model of network communications according to examples of the disclosure. In one or more examples, the graph 300 of FIG. 3 can represent an exemplary graph model of the traffic flow information acquired at step 202 of process 200 that is generated at step 204. In one or more examples, the graph 300 can include one or more nodes 302 and 304. In one or more examples, node 302 can represent a sender in a data transmission of the communication network, while node 304 can represent the receiver of a data transmission. In one or more example, nodes 302 and 304 can represent a vertex in the graph 300. In one or more examples, the graph 300 can also include one or more edges 306. In one or more examples, an edge 306 can represent a single data transmission between a sender node 302 and a receiver node 304. In one or more examples, the observed links between nodes (i.e., transmissions) can be represented as a directed multigraph (multiple edges allowed per source-to-destination pair), with each edge 306 of the graph 300 representing the presence of at least one observed flow from one computer host (graph vertex) to another. Thus, looking to the example of FIG. 3, a single node 302 can have multiple edges 306 that are flowing from node 302 to receiver node 304, with each edge 306 representing a data transmission from node 302 to node 304. In this way, the volume of data traffic observed during the collection time period can be represented in the graph. The more transmission between two nodes, the more edges the two nodes will have between them in the graph representation of the traffic flow.

Returning to the example, of FIG. 2, once the traffic flow has been represented in a graph form at step 204, the process 200 can move to step 206 wherein the node similarity between each of the nodes in the graphs (i.e., computing devices) can be calculated using a plurality of algorithms. In one or more examples, node similarity can refer to comparing a set of nodes and determining similarity based on the nodes that they are connected to. Thus, in one or more examples, node similarity can determine how similar nodes are with respect to one another based on the degree to which the two nodes are connected to the same nodes. Thus, in one or more examples, a high similarity score would indicate that the two nodes being considered have the same connection to a common node or set of nodes. Referring back to the example of FIG. 3, in on one or more examples, node 308 and node 310 maybe considered to be similar since they both connect to a common node 312. In contrast, two nodes may be scored poorly in terms of similarity if they do not connect to any common nodes. In one or examples, the similarity score of two nodes can be calculated using a plurality of methods as described below. In one or more examples, determining node similarity at step 206 can include determining the similarity using a plurality of methods, such that a separate similarity score or metric is generated for each method used to determine similarity. As discussed in detail below, this plurality of methods can be combined with other methods for determining clusters so as to find the optimal permutation of methods to use in a link prediction analysis.

Figure 4:
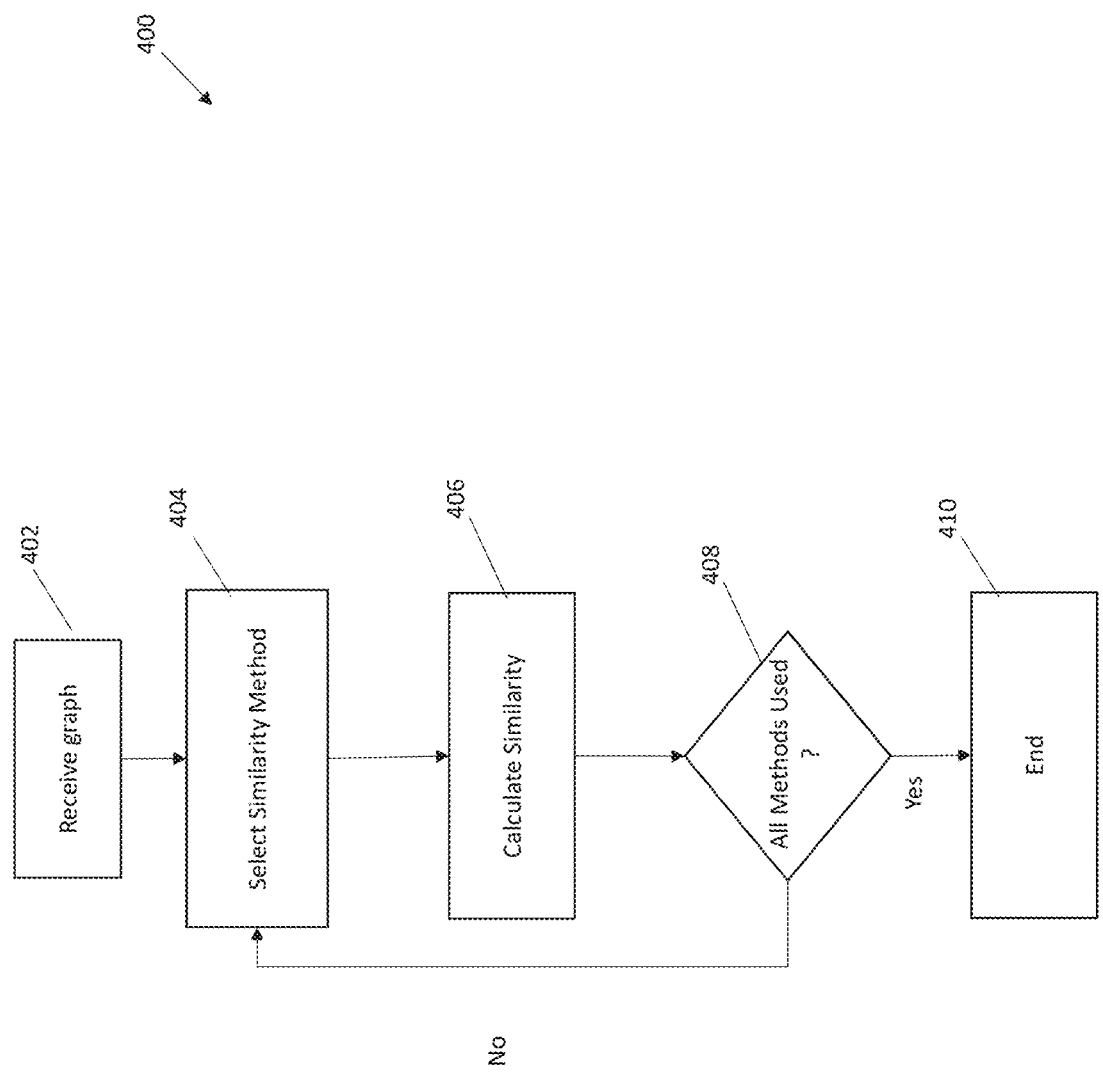
FIG. 4 illustrates an exemplary process for determining node similarity according to examples of the disclosure.

FIG. 4 illustrates an exemplary process for determining node similarity according to examples of the disclosure. In one or more examples, the process 400 can begin at step 402 wherein a graph generated as described above with respect to step 204 can be received. Once the graph has been received at step 402, the process 400 can move to step 404 wherein a method for determining node similarity can be selected. In one or more examples, node similarity can be an input to a clustering algorithm (described in detail below), however, there can be different methods to determining node similarity. For instance, some node similarity methods may take into account the number of distinct flows per source/destination (from a multigraph model). Additionally, or alternatively, since granting network access is a binary decision, using binary features (i.e., the presence of at least one link, or no links) that can be derived from a simple (no multi-edges) graph model may yield better similarity results. In one or more examples, the process 400 of FIG. 4 can generate similarity scores for the nodes of the graph received at step 402 using multiple methods to determine which method will ultimately be used to perform link prediction. In one or more examples, the method selected at step 404 can be selecting from a set of methods comprising: Jaccard coefficients, Adamic-Adar index, preferential attachment score, resource allocation index, and common neighbor.

In one or more examples, the Jaccard coefficient as a measure of similarity for a pair of nodes u and v can be defined as:

$$|\Gamma(u) \cap \Gamma(v)|/|\Gamma(u) \cup \Gamma(v)|$$

Here, $\Gamma(u)$ denotes the set of neighbors of $u$, and $|\cdot|$ denotes set cardinality. The Jaccard coefficient measures the number of common links (to other nodes) for a node pair, i.e., the likelihood of them having common features. In one or more examples, node similarity can be calculated using the Adamic-Adar index expressed below:

$$\sum_w 1/\log|\Gamma(w)|, \text{ for } w \in \Gamma(u) \cap \Gamma(v)$$

The Adamic-Adar index can refine the simple counting formula of the Jaccard coefficient by weighting rare features more heavily. In one or more examples, node similarity can be calculated using the preferential attachment score method expressed below:

$$|\Gamma(u)||\Gamma(v)|$$

Preferential attachment is the idea that nodes adjacent to many other nodes are likely to themselves become attached, according to a model of network growth. In one or more examples, node similarity can be calculated using the resource allocation index method expressed below:

$$\sum_w 1/|\Gamma(w)|, \text{ for } w \in \Gamma(u) \cap \Gamma(v)$$

In one or more examples, the resource allocation index method can operate under an assumption that for unlinked nodes, their common neighbors play the role of resource transmitters, the resource allocation index is a measure of the total resources transmitted between nodes u and v. Resource allocation index has a similar form to Adamic-Adar index. Their differences are insignificant if the degree of common neighbor w is small and great if the degree of w is large. Thus, resource allocation index provides better performance for networks of higher average degree.

In one or more examples, node similarity can be calculated using the Common Neighbor Centrality based Parameterized Algorithm (CCPA), which can be expressed below:

$$\alpha \cdot |\Gamma(u) \cap \Gamma(v)| + (1-\alpha) \cdot \frac{N}{d_{uv}}$$

Here, N is the total number of nodes in the graph, $d_{uv}$ is the graph distance between $u$ and $v$. Given that closeness centrality (average shortest graph distance between 2 nodes) is $N/d_{uv}$, then CCPA can be seen as a tradeoff between closeness centrality and the number of shared neighbors (the denominator of Jaccard coefficient), with $\alpha \in [0,1]$ as the tradeoff parameter. In one or more examples, the default value of $\alpha=0.8$. The methods for determining node similarity are meant as examples only and should not be seen as limiting the disclosure. Any node similarity method can be selected at step 404 and used during the process 400.

In one or more examples and at step 404, one of the methods of the plurality of methods for determining node similarity can be selected. Once a selection has been made the process 400 can move to step 406 wherein the method is used to calculate node similarity and the result is stored for later use (for instance in a memory). In one or more examples, once the result has been generated at step 406, the process 400 can move to step 408 wherein a determination is made as to whether all methods from the plurality of methods have been used. If it is determined at step 408 that not all of the methods have been used, then the process 400 can revert to step 404 wherein another similarity method (not previously selected) can be selected. If, however a determination is made at step 408 that all the available methods have been used and a separate result has been generated for each method, then the process can move to step 410 wherein the process is terminated.

Returning to the example of FIG. 2, once the node similarity process has been applied at step 206, the process 200 can move to step 208, wherein a node grouping process is applied to the graph built at step 204. In one or more examples, and as described above, the node similarity scoring described above can be used by a grouping and/or clustering algorithm to determine clusters of nodes in the computing network that behave similarly enough that they can be considered part of a group (i.e., a cluster). In one or more examples, each combination of node similarity calculation and node grouping can yield different results with varying levels of accuracy (with respect to link prediction), and thus in one or more examples, the systems and methods disclosed herein can consider each and every combination of node similarity and node grouping methods can be considered in order to ensure that the most accurate combination is ultimately used to perform link prediction.

Looking at the exemplary graph 300 of FIG. 3, in one or more examples, the graph can include a group 308 that can be made of one or more nodes. In the example of graph 300, the nodes in group 308 can be made up of nodes that have been determined to be similar using one of the techniques described above with respect to FIG. 4. In the example of graph 300, the nodes of group 308 can be determined to be similar (and thus clustered together) because each of them receive data transmissions from a common node in the network. In one or more examples, nodes 308 and 310 can form a group 314 because they connect over the network to a common node. The forming of groups can be based on the similarity method used, and thus in one or more examples, groupings can be different depending on the node similarity method used.

Figure 5:
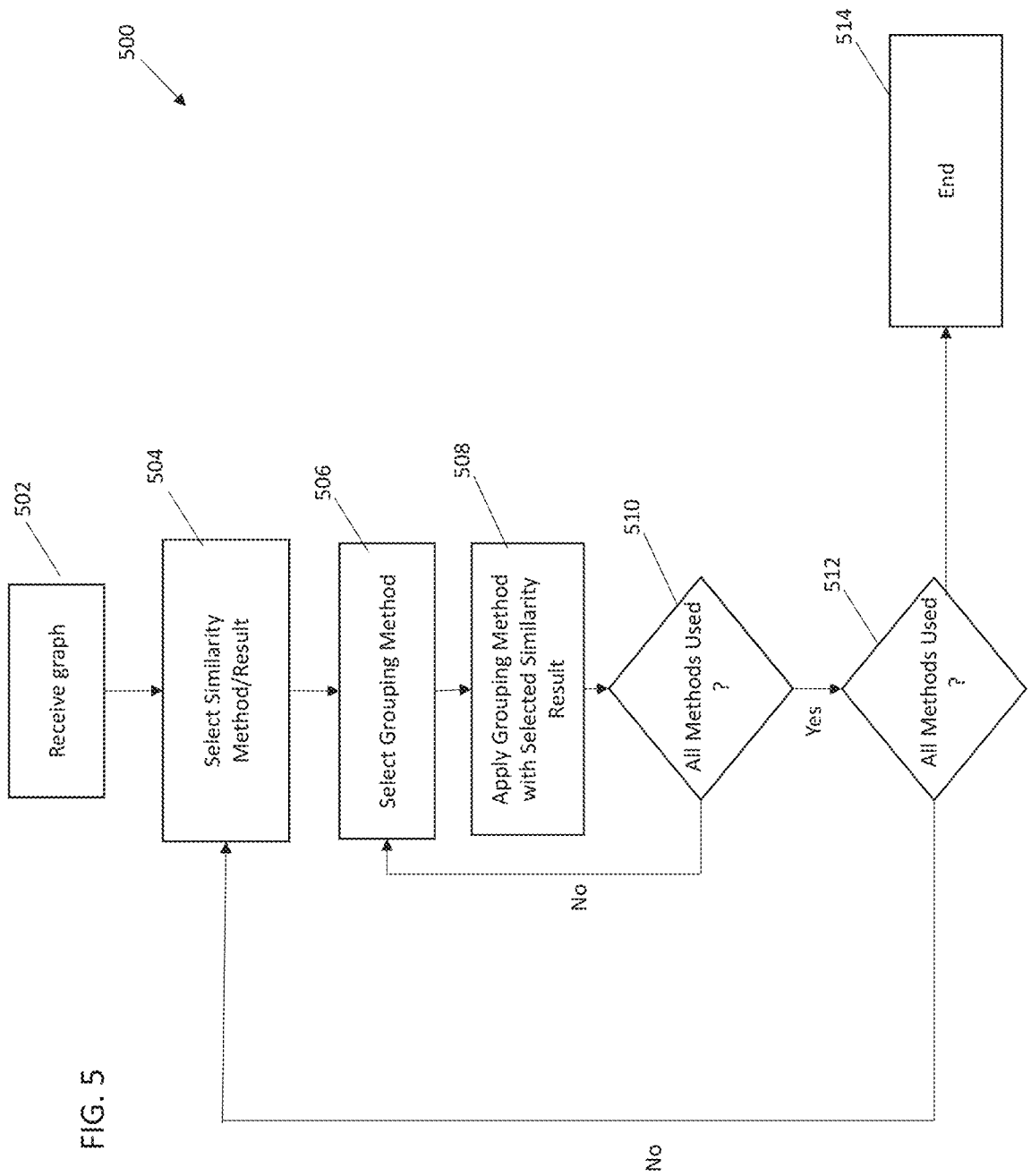
FIG. 5 illustrates an exemplary process for node grouping based on similarity according to examples of the disclosure.

FIG. 5 illustrates an exemplary process for node grouping based on similarity according to examples of the disclosure. In one or more examples, the process 500 of FIG. 5 can begin at step 502 wherein the graph of the computing network generated at step 204 can be received. In one or more examples, once the graph has been received at step 402, the process 500 can move to step 504 wherein a similarity result generated by the process 400 of FIG. 4 can be selected. As described above with respect to FIG. 4, the process 400 of FIG. 4 can end with a plurality of similarity results, each result corresponding one of the methods applied to determine similarity. In one or more examples, the process 500 of FIG. 5 can build upon the plurality of similarity results, by using each similarity result as an input to a plurality of node grouping methods, such that a grouping result is generated for every combination of similarity method and grouping method. Thus, in one or more examples, at step 506 a similarity result of the plurality similarity results is selected at step 504.

Once a similarity result has been selected at step 504, the process 500 can move to step 506, wherein a grouping method can be selected. In one or more examples, a grouping method can use a pairwise method that can include applying a threshold t∈[0,1]. Thus, in one or more examples, if a similarity measure $s_{uv}$ for a pair of nodes meets or exceeds the threshold ($s_{uv} \geq t$), then the node pair constitutes a group. In one or more examples, a grouping method can use clustering. For instance, in one or more examples, Hierarchical Density Based Spatial Clustering of Applications with Noise (HDBSCAN) can be used to perform clustering. HDBSCAN is a non-parametric algorithm that clusters points in high-density regions, marking those in low-density regions as outliers. HDBSCAN has the advantage of being relatively insensitive to configuration parameters, i.e., being largely parameter free. Our experiments use (inverse) Jaccard coefficient as the distance measure for HDBSCAN. In one or more examples, a node grouping method that can be selected at step 506 can include agglomerative hierarchical clustering that can uses a varsity of binary based distance measurements such as Rogers-Tanimoto distance, which has been shown to provide better accuracy than many other distance measurements.

In one or more examples, once a grouping method has been selected at step 506, the process 500 can move to step 508 wherein the selected similarity result (selected at step 504) can be used with the grouping method selected at step 506 to generate a node grouping result. The node grouping result generated at step 508 can include an identification of groups of nodes, with each group consisting of nodes that are deemed to be similar to one another and thus form a group. In one or more examples, the groups identified at step 508 can be used to predict future links as will be described in further detail below. In one or more examples, applying a grouping method can include selecting a pre-determined threshold for the similarity results, and grouping one or more nodes if the similarity between the nodes exceeds the pre-determined threshold. Thus, in one or more examples, applying a grouping method with the selected similarity result can include generating a plurality of grouping results, with each result pertaining to a specific pre-determined threshold. As will be discussed in further detail below, by providing multiple grouping results for a given combination of node similarity and node grouping methods by varying the pre-determined threshold, the process 200 can generate a curve which can be ultimately used to select the combination of node similarity and node grouping methods that yield the most accurate model.

In one or more examples, once the grouping result has been generated at step 508 for a particular combination of similarity method and grouping method, the process 500 can move to step 510, wherein a determination can be made as to whether any more grouping methods of the plurality of grouping methods are left to be explored for a given similarity method selected at step 504. In one or more examples, if it is determined that there are further grouping methods to be used for a given similarity result at step 508, then the process 500 can revert to step 506 wherein another grouping method (different from the one most recently used) can be selected. In one or more examples, if all of the grouping methods have been applied using the similarity results selected at step 504, then the process 500 can move to step 512, wherein a determination is made as to whether all of the similarity results have been analyzed or processed through each grouping method. If at step 512 it is determined that there are more similarity results to be used, then the process 500 can revert to step 504 wherein a new similarity result is selected. If, however, there are not further similarity results to process as determined at step 512, then the process 500 can move to step 514 wherein the process is terminated.

Returning to the example of FIG. 2, once the node grouping process has been completed at step 208 resulting in a plurality of node groupings for every combination of node similarity and node grouping processes, the process 200 can move to step 210 wherein the groupings can be used to induce predicted links. In one or more examples, the groups of nodes learned from each combination of node similarity function and grouping algorithm can then be combined with one or more link prediction methods, creating multiple models, with each model having a unique node similarity, node grouping, and link prediction method. In one or more examples, for each group of nodes for a given algorithmic combination, it induces a set of new (not previously observed) links that are predicted to occur in the future. The resulting set of predicted links are then assessed by comparing them with links that are observed in a subsequent period. In one or more examples, link prediction can be applied to application domains in which the graph nodes represent entities of the same type, e.g., users in a social network. In such domains, graph edges (links) represent affinity relationships. For computer networks, links represent connectivity between hosts (nodes) of different types (e.g., from a client to a server). Thus, in one or more examples, dependency (rather than affinity) maybe a more accurate criterion for link prediction.

Figure 6:
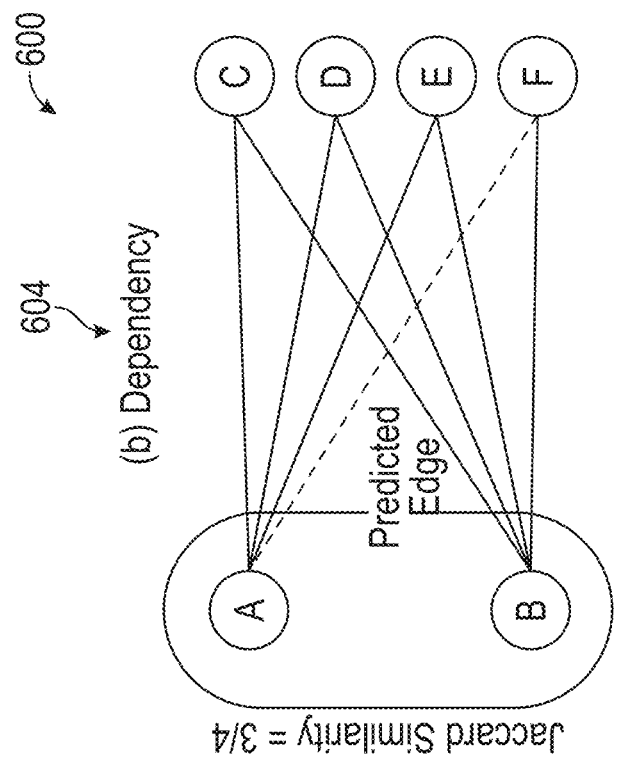
FIG. 6 illustrates exemplary graphs with predicted links according to examples of the disclosure.
Figure 6:
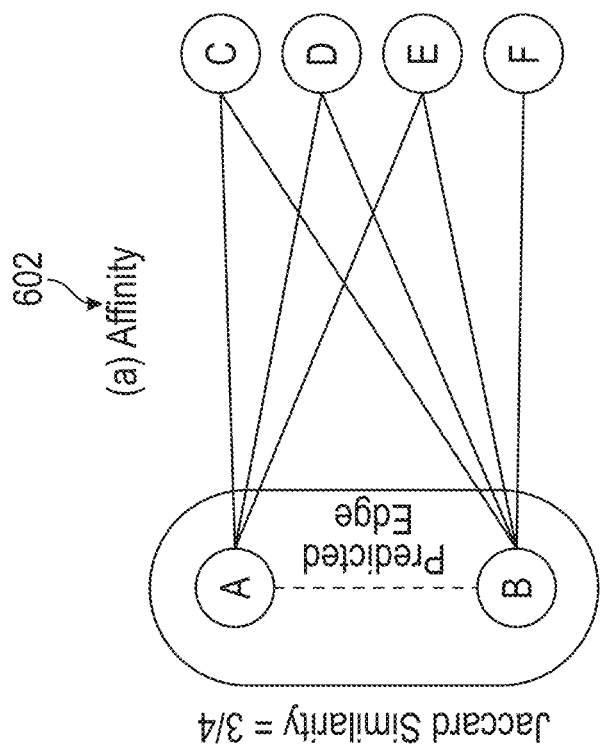

In one or more examples, the systems and methods described herein thus can also consider patterns of network connections that are consistent with dependency relationships. That is, rather than predicting that two similarly behaving nodes will themselves link together (show affinity with one another), it can predict that two such nodes will link with other nodes in the same way (have common dependencies). FIG. 6 illustrates exemplary graphs with predicted links according to examples of the disclosure. In one or more examples, the exemplary graphs 600 of FIG. 6 illustrate an affinity-based example 602 and a dependency-based example 604. In the affinity-based example 602, nodes A and B can be grouped using the methods described above with respect to FIG. 2 and FIG. 5. In one or more examples, node A has edges connecting to nodes C, D, and E, indicating that during the initial monitoring period (i.e., step 202 of FIG. 2) there were data transmissions between node A and nodes C, D, and E. In the example of 602, node B has edges connecting to nodes C, D, E, and F indicating that during the initial monitoring period (i.e., step 202 of FIG. 2) there were data transmissions between node B and nodes C, D, E, and F. Since node A and node B have been grouped together, in the affinity-based example of 602, a link between node A and node B will be predicted since they share an affinity to one another (i.e., they connect to many of the same nodes).

In contrast, example 604 can represent a dependency-based link prediction. In the example 604 (with nodes A and B connected to C, D, E, and F in the same manner as example 602), rather than looking to the affinity of A and B to predict a link between them, instead the prediction can focus on ensuring that nodes A and B have common dependencies, and thus in one or more examples, a predicted link may be established between nodes A and F, since node F has connectivity to node B, and nodes A and B are in the same group. In one or more examples, the predicted link created between nodes A and F can emulate the link between nodes B and F including for instance using the same ports that are used to facilitate communications between B and F. Thus, in one or more examples the links can be predicted to ensure that all of the members in the same group have the same dependencies, and thus, any predicted links can be established between a node and any dependent nodes that are not connected to the node but are connected to a node in the same group as determined by the processes described above.

Figure 7:
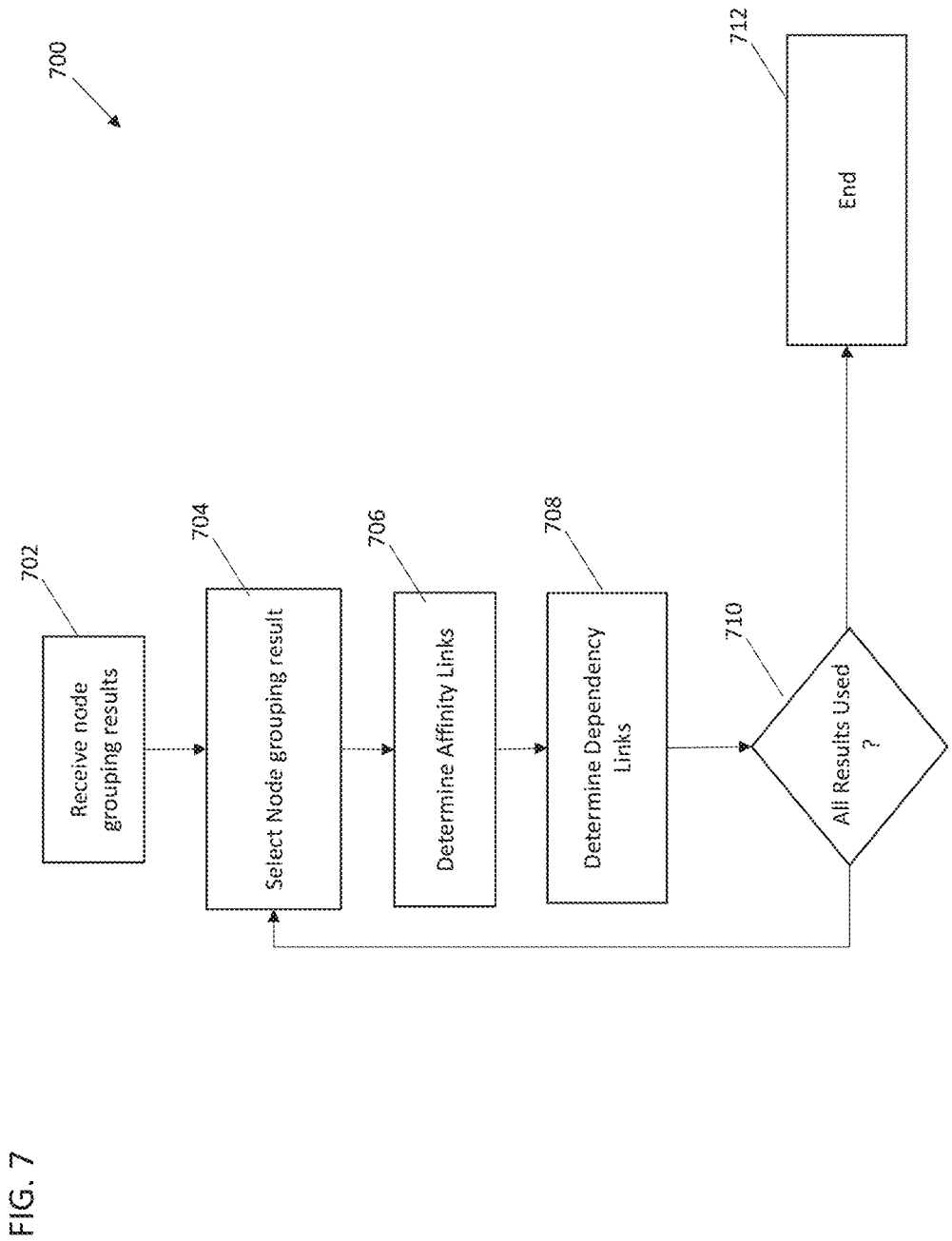
FIG. 7 illustrates an exemplary process for link induction according to examples of the disclosure.

FIG. 7 illustrates an exemplary process for link induction according to examples of the disclosure. In one or more examples, the process 700 can begin at step 702 wherein the node grouping results (a separate result for each combination of node similarity and grouping methods and similarity threshold) generated by process 500 described above is received. In one or more examples, once each of the results have been received at step 702, the process 700 can move to step 704 wherein one of the results of the results received at step 702 is selected.

Once selected at step 704, the process 700 can move to step 706 wherein one or more affinity-based links (as described above with respect to FIG. 6) can be predicted for the graph associated with the result selected at step 704. Separately, at step 708, one or more dependency-based links can be predicted (as described above with respect to FIG. 6) can be predicted for the graph associated with the result selected at step 704. Thus, in one or more examples, for each node grouping result analyzed two separate link predictions will be generated, one based on an affinity-based approach, and another using the dependency-based approach.

In one or more examples, once the affinity and dependency-based predictions have been made at steps 706 and 708 respectively, the process 700 can move to step 710 wherein a determination is made as to whether all of the grouping results received at 702 have been analyzed to determine both affinity and dependency link predictions. In one or more examples, if it is determined at step 710 that all results have not been analyzed, then the process 700 can revert back to step 704 wherein a previously unselected result is selected and processed to predict links in accordance with the process described above. If, however, it is determined at step 710 that all results received at step 702 have been analyzed, then the process 700 can move to step 712 wherein the process is terminated.

Returning to the example of FIG. 2, once the predicted links have been induced at step 210, the process 200 can move to step 212 wherein a model (i.e., a specific combination of node similarity, node grouping, and link prediction method) can be selected and tuned. In one or more examples, the systems and methods disclosed herein can compare the links predicted by a given combination against links that are indeed observed during a pre-determined period of time to determine which model yields the most accurate result.

In order to form the basis of model selection, potential future links that are predicted to be observed can be denoted as Predicted. Links that are observed during the pre-determined period are denoted Actual. The set of true positive links TP are then those that were predicted and indeed observed:

$$TP = Predicted \cap Actual$$

False positive links are those that were predicted but were not observed and can be denoted as:

$$FP = Predicted - TP$$

For cyber networks, as for most application domains, only a small fraction of node pairs form links. Link prediction thus can exhibit extreme class imbalance since there are many more negative instances than positive ones. For such unbalanced problems, accuracy may not be a good measure of quality, since it can be dominated by the negative instances. Instead, recall and precision (with associated areas under their curves) may serve as better measures for evaluating link prediction quality. In one or more examples, Recall can measure the ability to predict the positive class and can be expressed as:

$$Recall = |TP|/|Actual| = |TP|/|TP+FN|$$

Recall can be particularly relevant when false negatives are more of a concern (relative to false positives). For network policy optimization, false negatives can translate to denying edges that are indeed needed for operations. This may not introduce additional security risk, but it can impact the organizational mission. Precision can refer to the accuracy of the positive class and can be expressed as:

$$Precision = |TP|/|Predicted| = |TP|/|TP+FP|$$

Precision can be particularly relevant when false positives are more of a concern (relative to false negatives). For network policy optimization, false positives can translate to allowing edges that are not needed operationally. This can introduce additional security risk, with no mission availability reward. F1 score $F_1$ can represent the harmonic mean of recall and precision and can be expressed as:

$$F_1 = (2 \cdot \text{Recall} \cdot \text{Precision}) / (\text{Recall} + \text{Precision})$$

The harmonic mean can be suited to such fractional measures as recall and precision. Because of the product term in the numerator (as opposed to a sum for arithmetic mean), the harmonic mean punishes extreme values of recall or precision. For example, the arithmetic average for Recall=1 and Precision=0 is 0.5, but the F1 score is zero. In one or more examples, and for operational cyber security uses, a weighted F1 score could be applied, with recall weighed more heavily in low-risk situations, and precision weighed more heavily in high-risk ones. As described in detail below, the $F_1$ calculation described above can be used to determine the performance of a particular combination of methods described above.

In one or more examples, using precision and recall calculations (i.e., combined as an F1 score) alone can measure performance (i.e., accuracy of prediction) but may lack any cyber resiliency context. In other words, while the F1 calculation above may be a good indicator of performance of the link prediction methods described above, the performance measurement may not take into account the impacts of predicted links on both mission access (i.e., opening communications links needed for various operational scenarios) and threat containment (i.e., opening communications links that can serve as attack vectors for a cyber adversary). Thus, in one or more examples and in order to ensure that link prediction performance takes into account cyber resiliency, alternatives to the recall and precision measures described above can be formulated to incorporate cyber resiliency considerations in their formulations.

As discussed above, there can be multiple link prediction outcomes in the context of cyber security operations: True positive, false positive, false negative, and true negative. A true positive can refer to a link that is both predicted and that is in fact needed during operation of the computing network. Such a link adds mission value by now being available (i.e., it would not have been available if the baseline policy were based on historical traffic only). On the other hand, a false negative can refer to a link that was not predicted but turns out to be required or needed during operation of the computing network. In that false negative scenario, the lack of prediction can mean that the link would not be available during operation of the network thereby hampering the mission access of the computing network. Thus, in the context of cyber security operations, a link prediction that yields more true positives can be seen as supporting the mission more so than a link prediction that yields more false negatives, since that means the link prediction model provided support to the mission of the computing system.

In one or more examples, a false positive can refer to a link that was predicted but ultimately was not needed during operation of the computing network. A false positive may not have any effect on supporting the mission since while predicted the link was not ever utilized, however, the addition of the link (while not needed) can add a potential attack vector for a malicious actor to gain access to a network resource and further exploit the network. A true positive (described above) while supporting the mission needs, can also provide an additional attack vector that can be exploited by a malicious actor to gain unauthorized access to the computing network. Thus, in one or more examples, both a true positive and a false positive can add additional attack vectors that can be exploited by a cyber malicious actor. On the other hand, a false negative (described above) will not add an additional attack vector since the link was not predicted and thus the link was not provisioned during operation of the computing network. In one or more examples, a true negative can refer to a link that was neither predicted nor needed during operation of the computing network. Such a link may not have any effect on the mission of the computing network and will not add an additional attack vector. A summary of the various link prediction results described above is provided in Table 1 below.

TABLE 1

| | | | Link Predicted | | |
| --- | --- | --- | --- | --- | --- |
| | | | Yes | | |
| | | | Adds access | Measured via precision | No No access added |
| Link Needed | Yes | Potential mission contribution | True Positive | | False Negative |
| | | Measured via recall | Supports mission | Can add attack vector | Hampers mission | No attack vector added |
| | No | Not relevant to mission | False Positive Mission N/A | Can add attack vector | True Negative Mission N/A | No attack vector added |

As demonstrated in Table 1 above, each predicted link can be categorized based on whether the predicted link was later required to be utilized or not (i.e., a true positive or a false negative.) True positives while supporting the mission, can also add a potential attack vector. False positives, while not supporting mission needs, can also add an additional attack vector. In one or more examples, links that were utilized but not predicted can hamper the mission, however such a failure to predict the link may not add an attack vector. True negatives (i.e., links that were not predicted nor used) may not have any effect on mission success nor will they add an additional attack vector.

In one or more examples, to take into account cyber resiliency when selecting a link prediction method, both mission support and threat containment can be taken into account (additionally or alternatively to recall and precision) to optimize the link prediction method that is used to formulate microsegmentation policy).

Mission access (described above) can refer to how the predicted link supports the mission (or hampers the mission). As described above, a true positive prediction can support mission access, while a false negative can hamper mission access. In one or more examples, a mission-access utility function can be used that can extend the formula for recall to assess how predicted links provide access to mission critical resources. As an example of a mission-access utility function, let $t_i \in T$ denote a link $t_i$ within the set of links T observed in training. Next, we let $w(t_i) \in [0,1]$ denote the mission criticality of $t_i$. This has normalization $\Sigma w(t_i) = 1$, where the summation is over all $t_i \in T$. We let $TP(t_i)$ denote the cardinality of a true positive prediction of $t_i$, and $FN(t_i)$ denote the cardinality of a false negative prediction of $t_i$. mission-access utility function $u_{MA}$ can be defined as follows:

$$u_{MA} = \frac{\sum w(t_i) \cdot TP(t_i)}{\sum w(t_i) \cdot TP(t_i) + \sum w(t_i) \cdot FN(t_i)}$$

By definition, the true positives and false negatives are disjoint as expressed in the formula below:

$$\{TP(t_i)|t_i \in T\} \cap \{FN(t_i)|t_i \in T\} = \emptyset$$

The true positives and false negatives also cover all training links:

$$\{TP(t_i)|t_i \in T\} \cap \{FN(t_i)|t_i \in T\} = T$$

Using the above, leads to the following equation:

$$\Sigma w(t_i) \cdot TP(t_i) + \Sigma w(t_i) \cdot FN(t_i) = \Sigma w(t_i) = 1$$

And using the above, the mission-access utility function can thus reduce to:

$$u_{MA} = \Sigma w(t_i) \cdot TP(t_i)$$

The above utility function can thus be used in addition or alternatively to the F1 score described above to characterize the merits of a particular link prediction method. Similarly, a separate utility function can also be used to measure the impact of predicted links on threat containment (i.e., how many additional attack vectors are created by a link prediction method). In one or more examples, one such utility function can be to build a graph of potential attacks according to a user-defined attack/defense scenario, in which the scenario includes assumed attack starting host(s) and goal host(s).

In one or more examples, an attack graph A can be expressed as an n×n adjacency matrix (for n hosts), where element $a_{i,j}$ represents an attacker being able to reach from host i to host j. In one or more examples, the number of attack walks of a given length can be computed via matrix self-multiplication. That is, element $[A^p]_{i,j}$ of the adjacency matrix power $A^p$ is the number of attack walks from host i to host j of length p. In one or more examples, for a user-defined set of attack starting host(s), an n×1 (column) vector $s^{start}$ can be defined, where $s_i^{start}=1$ for host i as a starting host and $s_i^{start}=0$ otherwise. Likewise, for a user-defined set of attack goal host(s), an n×1 (column) vector $s^{goal}$ can be defined, where $s_i^{goal}=1$ for host i as a goal host, and $s_i^{goal}=0$ otherwise. With the information above, $s_p^{start \rightarrow goal}$ can be defined as the total (absolute) number of length-p walks from the starting host(s) to the goal host(s) according to the equation below:

$$s_p^{start \rightarrow goal} = [(A^p)^T h_{start}]^T h_{goal}$$

In one or more examples, to create a composite utility function over a range of attack walk lengths, the number of attack walks of length p can be normalized as follows:

$$\hat{s}_p^{start \rightarrow goal} = s_p^{start \rightarrow goal} / K^p$$

In one or more examples, normalizing factor $K^p$ can be then n×n adjacency matrix for a complete graph K raised to the pth power. The adjacency matrix for K has all elements set to unity (with the exception of the main diagonal, i.e., there are no self-loops), which has the largest possible number of length-p walks among n hosts. In one or more examples, a weighting scheme that prioritizes shorter attack walks from start to goal can be created. In particular, the weighting scheme can map numbers of progressively longer walks to progressively smaller numerical ranges yielding an overall score that observes a strict dominance of numbers of shorter walks over numbers of longer walks. This scheme yields the following threat-containment utility function $u_{TC}$:

$$u_{TC} = \sum_p (1 + \hat{s}_p^{start \rightarrow goal}) 2^{-p}$$

In one or more examples, the mission-access utility function as well as the threat containment utility function can be used to measure link prediction performance for various link prediction methods in a manner that takes into account both the mission needs of the computing system, as well as the increase in risk associated with adding additional links, thereby ensuring that any selected link prediction method takes cyber resiliency (described above) into account. In one or more examples, either utility function described above can be used individually or in conjunction with precision and recall to characterize a link prediction method. Additionally or alternatively, the utility functions described above can be used together to characterize a link prediction method. In one or more example, a join utility function that takes into account both mission-access and threat containment can be used to characterize a particular link prediction method.

In one or more examples, since the mission-access and threat-containment utility functions (described above) can be normalized to lie between zero and unity (unitless), it can be appropriate to apply the arithmetic mean for measuring their central tendency. Because different operational scenarios might require different tradeoffs between mission access and threat containment, user-defined weightings of α (for mission access) and 1−α (for threat containment) can be incorporated in an arithmetic mean. The overall resiliency utility function $u_{RB}$ for the assessing a prediction-enhanced baseline policy can thus be defined as follows:

$$u_{RB} = \alpha \cdot u_{MA} + (1-\alpha) \cdot u_{TC}$$

Once a baseline policy is built from observed links enhanced with predicted future links, in one or more examples, a variety of defensive actions (alone and in combination) for mitigating associated risks can be considered within a mission context. Such actions can include (but are not limited to) applying patches to address software weaknesses, clearing password caches, blocking network access, deploying deceptive honeypot computers, or providing redundant resources. Each combination of actions under consideration can be scored according to impacts on threats and organizational mission, via simulations under assumed operational scenarios. The combination of actions that provides the optimal simulated outcome can then deployed on the defended network.

Figure 8:
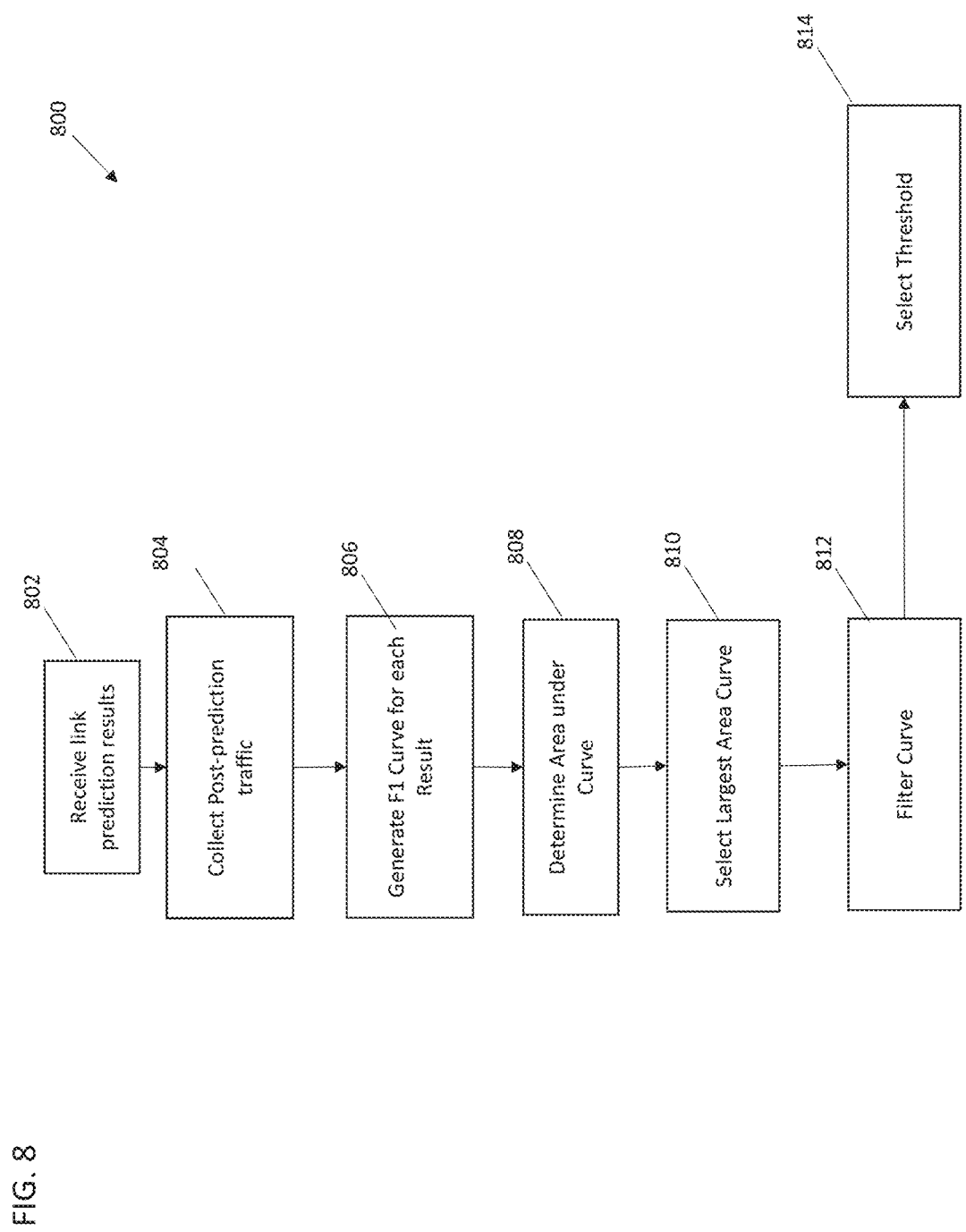
FIG. 8 illustrates an exemplary model selection and tuning process according to examples of the disclosure.

FIG. 8 illustrates an exemplary model selection and tuning process according to examples of the disclosure. In one or more examples, the process 800 can be configured to select a specific combination of node similarity, node grouping, and link prediction methods for use in determining a microsegmentation policy. In one or more examples, the process 800 can begin at step 802, wherein the link prediction results (generated by the process 700 of FIG. 7) can be received. In one or more examples, each result (i.e., combination of node similarity, node grouping, and threshold) can include one or more predicted links that while not having been observed yet, are predicted to occur based on past communications between the nodes of the computing network. In one or more examples, once the prediction results have been received at step 802, the process 800 can move to step 804 wherein another time period of network traffic can be monitored and logged. The time period can be selected so as to balance efficiency of analysis (i.e., not taking an exorbitant amount of time) with collecting sufficient data to ensure that the link predictions can be properly evaluated.

Figure 9:
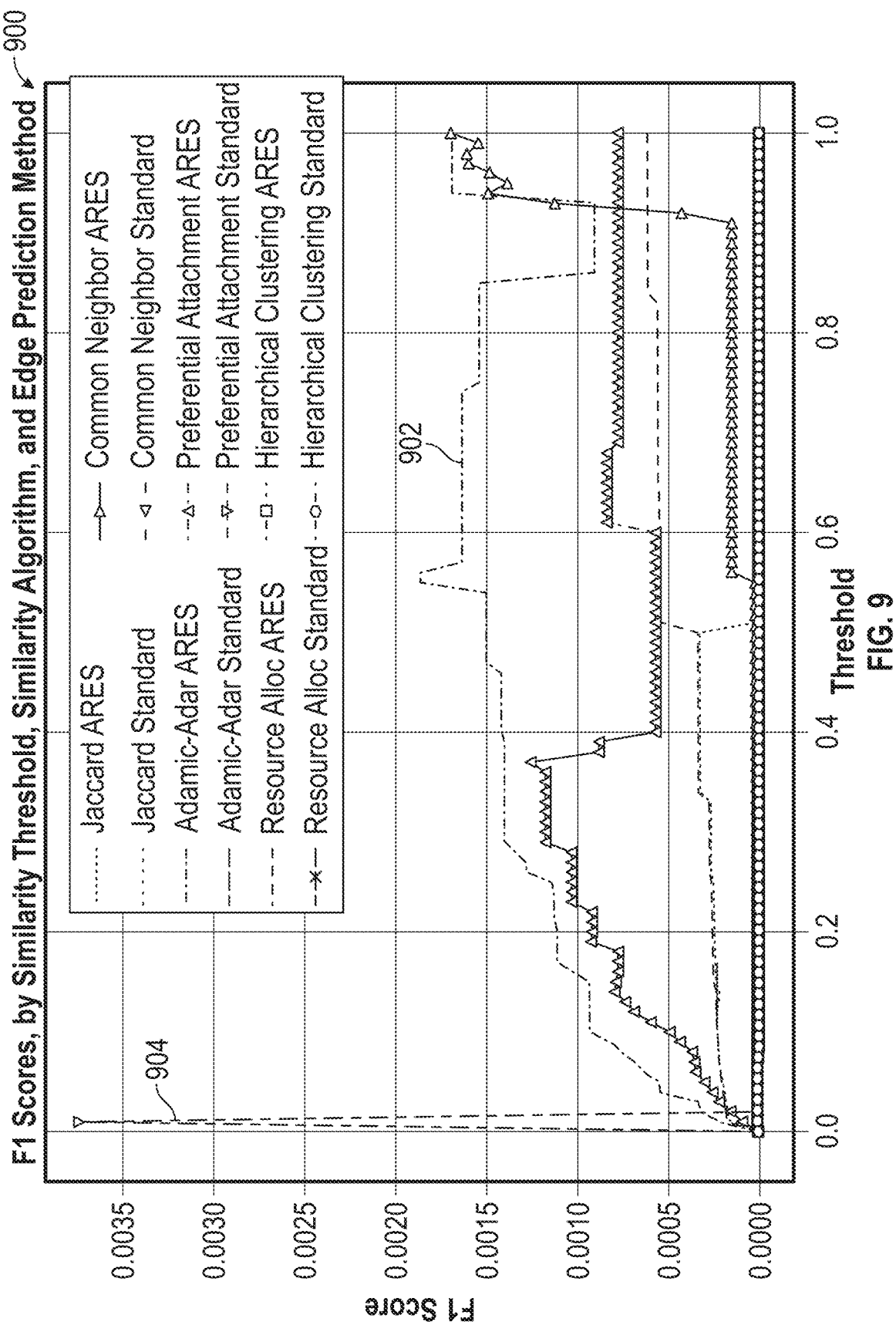
FIG. 9 illustrates exemplary performance curves according to examples of the disclosure.

In one or more examples, once the post-prediction (i.e., traffic collected after a prediction has been made) data has been collected at step 804, the process 800 can move to step 806 wherein an F1 curve can be generated for each combination of node similarity, node grouping, and link prediction method. As described above with respect to step 508, for each combination of node similarity, node grouping, and link prediction method, a plurality of results can be generated as a function of varying threshold levels associated with the node similarity (and in some examples, node grouping) methods. Thus, in one or more examples, a F1 curve can be generated using the expressions described above for each combination of methods. FIG. 9 illustrates exemplary F1 performance curves according to examples of the disclosure. As shown in the example of FIG. 9, an F1 curve can be generated for each combination of methods (one curve for each combination). The x-axis of the curve 900 of FIG. 9 can represent the varying threshold levels, while the y-axis represent the resulting F1 score, given the predicted links yielded by the combination of methods and given the collected traffic data taken post-prediction that can be used to validate the predictions made.

Returning to the example of FIG. 8, once an F1 curve has been generated for each combination of methods at step 806, the process 800 can move to step 808 wherein the area under each curve can be determined. The area of the F1 curve can represent an accumulated performance measure. Alternatively, the combination that yields the largest F1 value can be selected. Looking at the example of FIG. 9, curve 904 yields the largest F1 value of all the curves, however that peak is experienced over a narrow range of threshold values. This narrow operationally feasible range suggests that this model would not be robust to changes in the underlying behavior of the network over time, i.e., not suitable for deployment. This highlights the utility performance curve area for selecting models, which requires higher performance over a wider range.

As discussed above, there can be multiple performance measures (recall, precision, and F1) that can all vary as a function of sensitivity threshold. In one or more examples, F1 can be used as the measure of performance which can be quantified by measuring the area under the F1 score curve. However, the example of using the F1 curve to assess model performance should not be seen as limiting, and in one or more examples a recall and/or precision curve can be used instead. Thus, in one or more examples once the area under each curve is determined at step 808, the process 800 can move to step 810 wherein the curve with the largest area is selected, thus selecting the combination of methods that yield the most accurate link predictions.

In one or more examples, once the curve with the largest area has been selected at step 810, the process 800 can move to step 812 wherein the curve can be filtered to remove or minimize any sudden increases or decreases that may be due to noise. In one or more examples, performance curves can often exhibit abrupt transitions as the tuning parameter (similarity threshold for node grouping) is adjusted, further complicating the tuning process. Thus, in one or more examples, to address this this phenomenon, a low-pass signal filter can be applied to the prediction-quality curve for a given link prediction model. This signal filtering can help to abrupt transitions in performance curves that might interfere with accurately tuning the threshold. In one or more examples, a $4^{th}$-order low-pass Butterworth filter $B_4$ can applied to the F1 score curve $F_1(t)$ as shown in the expression below:

$$\widehat{F}_1(t) = B_4[F_1(t)]$$

In one or more examples, $\widehat{F}_1(t)$ can represent the resulting lowpass-filtered F1 score signal (as a function of similarity threshold t). The Butterworth filter can be maximally flat in its passband and has quick roll-off around the cutoff frequency, so that the desired frequencies are best selected. In one or more examples, low-pass signal filters themselves have parameters that can be tuned for a given application. For example, for the Butterworth filter described above, key parameters for the filter can include filter order (number of cascaded stages) and cutoff frequency. Higher order filters can provide a steeper drop off in frequency response beyond the cutoff frequency, i.e., are more selective in the frequency components they filter out. However, higher order filters can exhibit more ringing (oscillations) in response to abrupt changes in the input signal. In one or more examples, the cutoff frequency (for a low-pass filter) is the frequency at which the filter begins to attenuate higher-frequency signal components. For a digital Butterworth filter implementation, the cutoff can be expressed in terms of the critical frequency at which the gain drops to $1/\sqrt{2}$ (−3 decibels below) that of the passband, with frequency normalized to unity at the Nyquist frequency (one-half of the sampling rate).

FIG. 10 illustrates an exemplary filtered F1 performance curve according to examples of the disclosure. The curve 1002 of FIG. 10 illustrates an exemplary unfiltered F1 curve while curve 1004 illustrates the same curve after it has been filtered. As illustrated, the unfiltered curve includes an abrupt minimum 1006 that can lead to an inaccurate tuning of the threshold, however, when the filter is applied, curve 1004 illustrates that the abrupt transition is smoothed (see 1008), thus making the threshold prediction more accurate.

In one or more examples, once the curve has been filtered at step 812, the process 800 can move to step 814 wherein a threshold is selected using the filtered curve generated at step 812. In one or more examples, selecting a threshold can include selecting the threshold that corresponds to the maximum of the curve. In one or more examples that threshold can be determined using the argmax function yielding $t_{opt}^{argmax}$ as the estimated optimal threshold value as expressed below:

$$t_{opt}^{argmax} = \arg\max \widehat{F}_1(t)$$

Since it considers only a single point along the performance curve, argmax can be interpreted as the greediest (least risk averse) estimate. In one or more examples, a more conservative (risk averse) estimate can be to calculate the threshold $t_{opt}^{cog}$ as the performance curve's center of mass expressed below:

$$t_{opt}^{cog} = \frac{1}{M} \sum_{i=1}^{n} i \cdot \widehat{F}_1(t_i)$$

Here, $M = \sum_{i=1}^{n} \widehat{F}_1(t_i)$ can represent the total mass (area) of the F1 score. The center of mass method of determining a threshold can treat the performance curve as a mass distribution whose performance value at each point is considered a value of mass. The center of mass is then the value of threshold in which the relative position of the distributed mass sums to zero.

The argmax and center of mass provide can provide bounds (least and most risk averse, respectively) for estimating the optimal similarity threshold. In one or more examples, selecting a threshold at step 814 can include adaptively assign an intermediate value between these bounds. When the performance curve is relatively high at $t_{opt}^{cog}$, then there can be an incentive for the threshold to be more conservative (closer to $t_{opt}^{cog}$). When the performance curve is relatively low at $t_{opt}^{cog}$, then there can be more to gain by choosing a threshold value closer to $t_{opt}^{argmax}$. In one or more examples, the above blending can be accomplished by first defining a blending weight α as follows:

$$\alpha = F_1(t_{opt}^{cog})/F_1(t_{opt}^{argmax})$$

Thus, α can represent the value of the performance curve at the center of mass, normalized by the curve's maximum value. In one or more examples, the above expression can represent how well the center-of-mass estimate performs (relative to the maximum). In one or more examples, once α has been calculated it can be used to compute the intermediate value for estimating optimal similarity threshold $t_{opt}^{blend}$ as expressed below:

$$t_{opt}^{blend} = \alpha^\beta \cdot t_{opt}^{cog} + (1-\alpha^\beta) \cdot t_{opt}^{argmax}$$

Here, the factor β provides a nonlinear bias towards $t_{opt}^{argmax}$ (for β>1) or towards $t_{opt}^{cog}$ (for β<1). In one or more examples, the value of β can be empirically determined.

Returning to the example of FIG. 2, once the model has been selected and tuned at step 212, the process 200 can move to step 214 wherein the resultant model (with predicted links) can be used to develop a microsegmentation policy. In one or more examples, step 214 can be optional and simply represents an exemplary use case for the process described above with respect to steps 202-212 described above. In one or more examples, by grouping nodes and then predicting links, and microsegmentation policy can be developed that not only takes into account past network activity but is also developed using an accurate prediction of future network activity, thus making any microsegmentation policy more robust and proactive rather than merely reactive to past network traffic.

Figure 11:
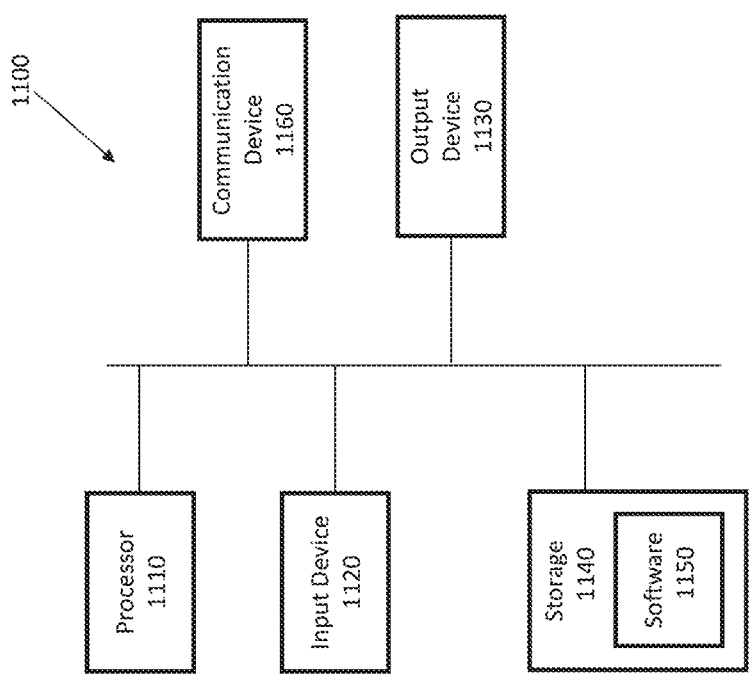
FIG. 11 illustrates an exemplary computing system, according to examples of the disclosure.

FIG. 11 illustrates an example of a computing system 1100, in accordance with some examples of the disclosure. System 1100 can be a client or a server. As shown in FIG. 11, system 1100 can be any suitable type of processor-based system, such as a personal computer, workstation, server, handheld computing device (portable electronic device) such as a phone or tablet, or dedicated device. The system 1100 can include, for example, one or more of input device 1120, output device 1130, one or more processors 1110, storage 1140, and communication device 1160. Input device 1120 and output device 1130 can generally correspond to those described above and can either be connectable or integrated with the computer.

Input device 1120 can be any suitable device that provides input, such as a touch screen, keyboard or keypad, mouse, gesture recognition component of a virtual/augmented reality system, or voice-recognition device. Output device 1130 can be or include any suitable device that provides output, such as a display, touch screen, haptics device, virtual/augmented reality display, or speaker.

Storage 1140 can be any suitable device that provides storage, such as an electrical, magnetic, or optical memory including a RAM, cache, hard drive, removable storage disk, or other non-transitory computer readable medium. Communication device 1160 can include any suitable device capable of transmitting and receiving signals over a network, such as a network interface chip or device. The components of the computing system 1100 can be connected in any suitable manner, such as via a physical bus or wirelessly.

Processor(s) 1110 can be any suitable processor or combination of processors, including any of, or any combination of, a central processing unit (CPU), graphics processing unit (GPU), field programmable gate array (FPGA), and application-specific integrated circuit (ASIC). Software 1150, which can be stored in storage 1140 and executed by one or more processors 1110, can include, for example, the programming that embodies the functionality or portions of the functionality of the present disclosure (e.g., as embodied in the devices as described above)

Software 1150 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1100 can implement any operating system suitable for operating on the network. Software 1150 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for predicting future links between one or more computing devices in a computing network, the method comprising:
   receiving first traffic information, wherein the first traffic information comprises information about one or more data transmissions between the one or more computing devices in the computing network, and wherein the first traffic information is collected over a pre-determined time period;
   generating a graph model of the computing network based on the received first traffic information, wherein the graph model comprises a plurality of nodes representing one or more computing devices in the computing network, and wherein the graph model comprises one or more edges representing data transmissions between the plurality of nodes;
   applying a plurality of node similarity calculation methods to the generated graph, and wherein the plurality of node similarity calculation methods generate a plurality of node similarity calculation results;
   for each node similarity calculation result of the plurality of node calculation results, applying a plurality of node grouping methods to the generated graph to generate a plurality of node grouping results, wherein each node grouping result corresponds to a combination of a node similarity calculation method of the plurality of node similarity calculation methods and a node grouping method of the method of the plurality of node grouping methods;
   for each combination of a node similarity calculation method of the plurality of node similarity calculation methods and a node grouping method of the method of the plurality of node grouping methods, applying one or more link prediction methods to predict a future data transmission between one or more computing devices of the computing network to generate a plurality of link prediction results, wherein each link prediction result corresponds to a combination of a node similarity calculation method of the plurality of node similarity calculation methods, a node grouping method of the method of the plurality of node grouping methods, and a node link prediction method of the one or more link prediction methods; and
   modifying one or more microsegmentation policies of the computing network based on one or more generated link prediction results.

2. The method of claim 1, wherein each node similarity calculation method of the plurality of node similarity calculation methods is configured to determine the similarity between the plurality of nodes in the generated graph.

3. The method of claim 2, wherein the plurality of node similarity methods are selected from the group consisting of: Jaccard coefficient method, Adamic-Adar method, Resource Allocation method, Common Neighbor method, and Preferential Attachment method.

4. The method of claim 1, wherein each node grouping method of the plurality of node grouping methods is configured to group one or more nodes of the generated graph based on the generated plurality of node similarity calculation results.

5. The method of claim 4, wherein the plurality of node grouping methods are selected from the group consisting of: a Pairwise grouping method, a Hierarchical Density Based Spatial Clustering of Applications with Noise (HDBSCAN) method, and a Hierarchical grouping method.

6. The method of claim 1, wherein the one or more link prediction methods are selected from the group consisting of: an affinity-based link prediction method, and a dependency-based link prediction method.

7. The method of claim 1, wherein the method comprises selecting a combination of a node similarity calculation method of the plurality of node similarity calculation methods, a node grouping method of the method of the plurality of node grouping methods, and a node link prediction method of the one or more link prediction methods.

8. The method of claim 7, wherein selecting the combination comprises:
   generating a performance curve for each combination of a node similarity calculation method of the plurality of node similarity calculation methods, a node grouping method of the method of the plurality of node grouping methods, and a node link prediction method of the one or more link prediction methods.

9. The method of claim 8, wherein generating a performance curve comprises:
   receiving second traffic information, wherein the additional traffic information comprises information about one or more data transmissions between the one or more computing devices in the computing network occurring after the first traffic information, and wherein the second traffic information is collected over a pre-determined time period;
   for each combination of a node similarity calculation method of the plurality of node similarity calculation methods, a node grouping method of the method of the plurality of node grouping methods, and a node link prediction method of the one or more link prediction methods, adjusting a threshold associated with the combination; and
   comparing the second traffic information with the link prediction results associated with the combination.

10. The method of claim 8, wherein the method comprises:
    selecting a combination of a node similarity calculation method of the plurality of node similarity calculation methods, a node grouping method of the method of the plurality of node grouping methods, and a node link prediction method of the one or more link prediction methods based on the generated performance curve for each combination.

11. The method of claim 8, wherein the method comprises:
    selecting a threshold value associated with the combination of a node similarity calculation method of the plurality of node similarity calculation methods, a node grouping method of the method of the plurality of node grouping methods, and a node link prediction method of the one or more link prediction methods.

12. The method of claim 11, wherein selecting a threshold value comprises:
applying a filter function to the performance curve associated with the combination to generate a filtered performance curve; and
selecting a point on the filtered performance curve.

13. The method of claim 12, wherein selecting a point on the filtered curve comprises applying an arg max function to the filtered performance curve.

14. The method of claim 12, wherein selecting a point on the filtered curve comprises applying a center of mass function to the filtered performance curve.

15. The method of claim 12, wherein the filter function is a low-pass filter.

16. The method of claim 15, wherein the filter function is a Butterworth filter function.

17. A system for predicting future links between one or more computing devices in a computing network, the system comprising:
a memory;
one or more processors;
wherein the memory stores one or more programs that when executed by the one or more processors, cause the one or more processors to:
receive first traffic information, wherein the first traffic information comprises information about one or more data transmissions between the one or more computing devices in the computing network, and wherein the first traffic information is collected over a pre-determined time period;
generate a graph model of the computing network based on the received first traffic information, wherein the graph model comprises a plurality of nodes representing one or more computing devices in the computing network, and wherein the graph model comprises one or more edges representing data transmissions between the plurality of nodes;
apply a plurality of node similarity calculation methods to the generated graph, and wherein the plurality of node similarity calculation methods generate a plurality of node similarity calculation results;
for each node similarity calculation result of the plurality of node calculation results, apply a plurality of node grouping methods to the generated graph to generate a plurality of node grouping results, wherein each node grouping result corresponds to a combination of a node similarity calculation method of the plurality of node similarity calculation methods and a node grouping method of the method of the plurality of node grouping methods;
for each combination of a node similarity calculation method of the plurality of node similarity calculation methods and a node grouping method of the method of the plurality of node grouping methods, apply one or more link prediction methods to predict a future data transmission between one or more computing devices of the computing network to generate a plurality of link prediction results, wherein each link prediction result corresponds to a combination of a node similarity calculation method of the plurality of node similarity calculation methods, a node grouping method of the method of the plurality of node grouping methods, and a node link prediction method of the one or more link prediction methods; and modify one or more microsegmentation policies of the computing network based on one or more generated link prediction results.

18. The system of claim 17, wherein each node similarity calculation method of the plurality of node similarity calculation methods is configured to determine the similarity between the plurality of nodes in the generated graph.

19. The system of claim 17, wherein the plurality of node similarity methods are selected from the group consisting of: Jaccard coefficient method, Adamic-Adar method, Resource Allocation method, Common Neighbor method, and Preferential Attachment method.

20. The system of claim 17, wherein each node grouping method of the plurality of node grouping methods is configured to group one or more nodes of the generated graph based on the generated plurality of node similarity calculation results.

21. The system of claim 20, wherein the plurality of node grouping methods are selected from the group consisting of: a Pairwise grouping method, a Hierarchical Density Based Spatial Clustering of Applications with Noise (HDBSCAN) method, and a Hierarchical grouping method.

22. The system of claim 17, wherein the one or more link prediction methods are selected from the group consisting of: an affinity-based link prediction method, and a dependency-based link prediction method.

23. The system of claim 17, wherein the one or more processors are caused to select a combination of a node similarity calculation method of the plurality of node similarity calculation methods, a node grouping method of the method of the plurality of node grouping methods, and a node link prediction method of the one or more link prediction methods.

24. The system of claim 23, wherein selecting the combination comprises:
generating a performance curve for each combination of a node similarity calculation method of the plurality of node similarity calculation methods, a node grouping method of the method of the plurality of node grouping methods, and a node link prediction method of the one or more link prediction methods.

25. The system of claim 24, wherein generating a performance curve comprises:
receiving second traffic information, wherein the additional traffic information comprises information about one or more data transmissions between the one or more computing devices in the computing network occurring after the first traffic information, and wherein the second traffic information is collected over a pre-determined time period;
for each combination of a node similarity calculation method of the plurality of node similarity calculation methods, a node grouping method of the method of the plurality of node grouping methods, and a node link prediction method of the one or more link prediction methods, adjusting a threshold associated with the combination; and
comparing the second traffic information with the link prediction results associated with the combination.

26. The system of claim 24, wherein the one or more processors are caused to:
select a combination of a node similarity calculation method of the plurality of node similarity calculation methods, a node grouping method of the method of the plurality of node grouping methods, and a node link prediction method of the one or more link prediction methods based on the generated performance curve for each combination.

27. The system of claim 23, wherein the one or more processors are caused to:
   select a threshold value associated with the combination of a node similarity calculation method of the plurality of node similarity calculation methods, a node grouping method of the method of the plurality of node grouping methods, and a node link prediction method of the one or more link prediction methods.

28. The system of claim 27, wherein selecting a threshold value comprises:
   applying a filter function to the performance curve associated with the combination to generate a filtered performance curve; and
   selecting a point on the filtered performance curve.

29. The system of claim 28, wherein selecting a point on the filtered curve comprises applying an arg max function to the filtered performance curve.

30. The system of claim 28, wherein selecting a point on the filtered curve comprises applying a center of mass function to the filtered performance curve.

31. The system of claim 28, wherein the filter function is a low-pass filter.

32. The system of claim 31, wherein the filter function is a Butterworth filter function.

33. A non-transitory computer readable storage medium storing one or more programs for predicting future links between one or more computing devices in a computing network, the programs for execution by one or more processors of an electronic device that when executed by the device, cause the device to:
   receive first traffic information, wherein the first traffic information comprises information about one or more data transmissions between the one or more computing devices in the computing network, and wherein the first traffic information is collected over a pre-determined time period;
   generate a graph model of the computing network based on the received first traffic information, wherein the graph model comprises a plurality of nodes representing one or more computing devices in the computing network, and wherein the graph model comprises one or more edges representing data transmissions between the plurality of nodes;
   apply a plurality of node similarity calculation methods to the generated graph, and wherein the plurality of node similarity calculation methods generate a plurality of node similarity calculation results;
   for each node similarity calculation result of the plurality of node calculation results, apply a plurality of node grouping methods to the generated graph to generate a plurality of node grouping results, wherein each node grouping result corresponds to a combination of a node similarity calculation method of the plurality of node similarity calculation methods and a node grouping method of the method of the plurality of node grouping methods;
   for each combination of a node similarity calculation method of the plurality of node similarity calculation methods and a node grouping method of the method of the plurality of node grouping methods, apply one or more link prediction methods to predict a future data transmission between one or more computing devices of the computing network to generate a plurality of link prediction results, wherein each link prediction result corresponds to a combination of a node similarity calculation method of the plurality of node similarity calculation methods, a node grouping method of the method of the plurality of node grouping methods, and a node link prediction method of the one or more link prediction methods; and
   modify one or more microsegmentation policies of the computing network based on one or more generated link prediction results.

34. The non-transitory computer readable storage medium of claim 33, wherein each node similarity calculation method of the plurality of node similarity calculation methods is configured to determine the similarity between the plurality of nodes in the generated graph.

35. The non-transitory computer readable storage medium of claim 34, wherein the plurality of node similarity methods are selected from the group consisting of: Jaccard coefficient method, Adamic-Adar method, Resource Allocation method, Common Neighbor method, and Preferential Attachment method.

36. The non-transitory computer readable storage medium of claim 33, wherein each node grouping method of the plurality of node grouping methods is configured to group one or more nodes of the generated graph based on the generated plurality of node similarity calculation results.

37. The non-transitory computer readable storage medium of claim 36, wherein the plurality of node grouping methods are selected from the group consisting of: a Pairwise grouping method, a Hierarchical Density Based Spatial Clustering of Applications with Noise (HDBSCAN) method, and a Hierarchical grouping method.

38. The non-transitory computer readable storage medium of claim 33, wherein the one or more link prediction methods are selected from the group consisting of: an affinity-based link prediction method, and a dependency-based link prediction method.

39. The non-transitory computer readable storage medium of claim 33, wherein the device is caused to select a combination of a node similarity calculation method of the plurality of node similarity calculation methods, a node grouping method of the method of the plurality of node grouping methods, and a node link prediction method of the one or more link prediction methods.

40. The non-transitory computer readable storage medium of claim 39, wherein selecting the combination comprises:
   generating a performance curve for each combination of a node similarity calculation method of the plurality of node similarity calculation methods, a node grouping method of the method of the plurality of node grouping methods, and a node link prediction method of the one or more link prediction methods.

41. The non-transitory computer readable storage medium of claim 40, wherein generating a performance curve comprises:
   receiving second traffic information, wherein the additional traffic information comprises information about one or more data transmissions between the one or more computing devices in the computing network occurring after the first traffic information, and wherein the second traffic information is collected over a pre-determined time period;
   for each combination of a node similarity calculation method of the plurality of node similarity calculation methods, a node grouping method of the method of the plurality of node grouping methods, and a node link prediction method of the one or more link prediction methods, adjusting a threshold associated with the combination; and comparing the second traffic information with the link prediction results associated with the combination.

42. The non-transitory computer readable storage medium of claim 40, wherein the device is caused to:

select a combination of a node similarity calculation method of the plurality of node similarity calculation methods, a node grouping method of the method of the plurality of node grouping methods, and a node link prediction method of the one or more link prediction methods based on the generated performance curve for each combination.

43. The non-transitory computer readable storage medium of claim 39, wherein the device is caused to:

select a threshold value associated with the combination of a node similarity calculation method of the plurality of node similarity calculation methods, a node grouping method of the method of the plurality of node grouping methods, and a node link prediction method of the one or more link prediction methods.

44. The non-transitory computer readable storage medium of claim 39, wherein selecting a threshold value comprises:

applying a filter function to the performance curve associated with the combination to generate a filtered performance curve; and selecting a point on the filtered performance curve.

45. The non-transitory computer readable storage medium of claim 44, wherein selecting a point on the filtered curve comprises applying an arg max function to the filtered performance curve.

46. The non-transitory computer readable storage medium of claim 44, wherein selecting a point on the filtered curve comprises applying a center of mass function to the filtered performance curve.

47. The non-transitory computer readable storage medium of claim 44, wherein the filter function is a low-pass filter.

48. The non-transitory computer readable storage medium of claim 47, wherein the filter function is a Butterworth filter function.

* * * * *